(12) United States Patent
Mahkonen et al.

(10) Patent No.: US 11,485,493 B2
(45) Date of Patent: Nov. 1, 2022

(54) USING A CELLULAR INTERFACE FOR UNMANNED AERIAL VEHICLE COMMUNICATIONS

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 16/958,325

(22) PCT Filed: Dec. 29, 2017

(86) PCT No.: PCT/IB2017/058525
§ 371 (c)(1),
(2) Date: Jun. 26, 2020

(87) PCT Pub. No.: WO2019/130050
PCT Pub. Date: Jul. 4, 2019

(65) Prior Publication Data
US 2021/0206490 A1 Jul. 8, 2021

(51) Int. Cl.
*B64C 39/02* (2006.01)
*G08G 5/00* (2006.01)
(Continued)

(52) U.S. Cl.
CPC ......... *B64C 39/024* (2013.01); *G05D 1/0022* (2013.01); *G08G 5/0013* (2013.01);
(Continued)

(58) Field of Classification Search
CPC ............ B64C 2201/146; B64C 39/024; G05D 1/0022; G08G 5/0008; G08G 5/0013;
(Continued)

(56) References Cited

U.S. PATENT DOCUMENTS 7,813,326 B1   10/2010   Kelm et al.
9,363,690 B1    6/2016   Singh et al.
(Continued)

FOREIGN PATENT DOCUMENTS

CN   101836478 A   9/2010
CN   104053195 A   9/2014
(Continued)

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.
(Continued)

*Primary Examiner* — Tan H Trinh
(74) *Attorney, Agent, or Firm* — Nicholson De Vos Webster & Elliott LLP

(57) ABSTRACT

A method for managing connections between an Unmanned Aerial Vehicle (UAV) and one or more associated UAV devices is described. The method includes determining, by a radio control management service, that one or more associated UAV devices are attached to a wireless network; determining, by the radio control management service, that one or more UAVs are attached to the wireless network; and routing, by the radio control management service in response to determining that the one or more associated UAV devices and one or more UAVs are attached to the network, at least one of (1) communications from at least one of the one or more UAVs to at least one of the one or more associated UAV devices and (2) communications from at least one of the one or more associated UAV devices to at least one of the one or more UAVs.

17 Claims, 14 Drawing Sheets

(51) Int. Cl.
*G05D 1/00* (2006.01)
*H04W 76/12* (2018.01)
*H04W 4/029* (2018.01)

(52) U.S. Cl.
CPC ......... *G08G 5/0034* (2013.01); *G08G 5/0069* (2013.01); *H04W 4/029* (2018.02); *H04W 76/12* (2018.02); *B64C 2201/146* (2013.01)

(58) Field of Classification Search
CPC .... G08G 5/0021; G08G 5/0034; G08G 5/006; G08G 5/0069; H04B 7/18504; H04W 4/00; H04W 4/021; H04W 4/029; H04W 76/12
USPC ................. 455/11.1, 297, 427, 428; 244/175
See application file for complete search history.

(56) References Cited

U.S. PATENT DOCUMENTS

| | | |
|---|---|---|
| 9,412,278 B1 | 8/2016 | Gong et al. |
| 9,467,922 B1 | 10/2016 | Buchmueller et al. |
| 9,537,561 B1 | 1/2017 | Kotecha et al. |
| 9,588,516 B1 | 3/2017 | Gurel et al. |
| 9,609,288 B1 | 3/2017 | Richman et al. |
| 9,709,409 B2 | 7/2017 | Dave et al. |
| 2004/0156399 A1 | 8/2004 | Eran |
| 2007/0284474 A1 | 12/2007 | Olson et al. |
| 2010/0062774 A1 | 3/2010 | Motegi et al. |
| 2010/0085236 A1 | 4/2010 | Franceschini et al. |
| 2010/0153001 A1 | 6/2010 | Bauchot et al. |
| 2010/0254346 A1 | 10/2010 | Jain et al. |
| 2012/0225675 A1 | 9/2012 | Nishida et al. |
| 2013/0233964 A1* | 9/2013 | Woodworth ............ B64C 25/58 244/175 |
| 2015/0038140 A1 | 2/2015 | Kilpatrick et al. |
| 2015/0119043 A1 | 4/2015 | Gopal et al. |
| 2015/0208300 A1 | 7/2015 | Mclaughlin et al. |
| 2015/0312813 A1 | 10/2015 | Xu et al. |
| 2016/0065345 A1 | 3/2016 | Kim et al. |
| 2016/0070265 A1 | 3/2016 | Liu et al. |
| 2016/0125740 A1 | 5/2016 | Pasko et al. |
| 2016/0140851 A1 | 5/2016 | Levy et al. |
| 2016/0142944 A1 | 5/2016 | Cao |
| 2016/0142994 A1 | 5/2016 | Luo et al. |
| 2016/0161258 A1 | 6/2016 | Magson et al. |
| 2016/0266579 A1 | 9/2016 | Chen et al. |
| 2016/0284221 A1 | 9/2016 | Hinkle et al. |
| 2016/0292403 A1 | 10/2016 | Gong et al. |
| 2016/0300493 A1 | 10/2016 | Ubhi et al. |
| 2016/0300495 A1 | 10/2016 | Kantor et al. |
| 2016/0358187 A1 | 12/2016 | Radocchia et al. |
| 2016/0363929 A1* | 12/2016 | Clark .................... B64C 39/024 |
| 2016/0371985 A1 | 12/2016 | Kotecha |
| 2016/0371987 A1* | 12/2016 | Kotecha .............. G05D 1/0022 |
| 2016/0380692 A1 | 12/2016 | Jalali et al. |
| 2017/0023939 A1 | 1/2017 | Leonard et al. |
| 2017/0045884 A1* | 2/2017 | Kablaoui ............. G05D 1/0022 |
| 2017/0092137 A1 | 3/2017 | Hiebl |
| 2017/0124884 A1 | 5/2017 | Shaw et al. |
| 2017/0142766 A1 | 5/2017 | Kim |
| 2017/0150373 A1 | 5/2017 | Brennan et al. |
| 2017/0168480 A1 | 6/2017 | Wanstedt et al. |
| 2018/0086483 A1 | 3/2018 | Priest et al. |
| 2018/0152510 A1 | 5/2018 | Newton et al. |
| 2018/0247544 A1 | 8/2018 | Mustafic et al. |
| 2018/0279348 A1 | 9/2018 | Huang et al. |
| 2019/0012923 A1 | 1/2019 | Weisbrod et al. |
| 2019/0013923 A1* | 1/2019 | Liu ........................ H04B 15/00 |
| 2019/0087576 A1 | 3/2019 | Olson |
| 2019/0088156 A1* | 3/2019 | Choi .................... G05D 1/0038 |
| 2019/0112048 A1* | 4/2019 | Culver .................. B64C 39/024 |
| 2019/0289505 A1 | 9/2019 | Thomas et al. |
| 2019/0364492 A1 | 11/2019 | Azizi et al. |
| 2020/0005651 A1 | 1/2020 | Priest |
| 2020/0100187 A1* | 3/2020 | Balasubramanian ........................ H04W 52/241 |
| 2020/0105149 A1 | 4/2020 | Mahkonen et al. |
| 2020/0193844 A1 | 6/2020 | Mahkonen et al. |
| 2020/0225684 A1* | 7/2020 | Anderson ............. B64C 39/022 |
| 2021/0129982 A1* | 5/2021 | Collins ................. B64C 39/022 |
| 2021/0274311 A1* | 9/2021 | Mahkonen ........... G08G 5/0069 |
| 2021/0314081 A1* | 10/2021 | Shattil .................... G06N 20/20 |

FOREIGN PATENT DOCUMENTS

| | | |
|---|---|---|
| CN | 105828345 A | 8/2016 |
| EP | 2175290 A1 | 4/2010 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, "3rd Generation Partnership Project, Technical Specification Group Services and System Aspects, Functional stage 2 description of Location Services (LCS)", (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, "3rd Generation Partnership Project, Technical Specification Group Radio Access Network, Evolved Universal Terrestrial Radio Access (E-UTRA) LTE physical layer; General description", (Release 14), Sep. 2016, 15 pages.
3GPP TS 45.002 V14.0.0, "3rd Generation Partnership Project, Technical Specification Group Radio Access Network, GSM/Edge Multiplexing and multiple access on the radio path", (Release 14), Dec. 2016, 142 pages.
Aerodynamics, Beginners' Guide: Radio Control, available online at <https://rcplanes.online/guide1.htm>, May 8, 2019, 9 pages.
Curran et al., "Location Based Predictive Handoff Algorithm for Mobile Networks," Advances in Intelligent IT: Active Media Technology, May 2006, pp. 86-91.
Federal Aviation Administration, "Automatic Dependent Surveillance-Broadcast (ADS-B)", Mar. 12, 2019, 2 pages.
Forsberg, Fredrik, "Providing Air Traffic Control Services for Small Unmanned Aircraft Through LTE", Oct. 28, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", American Institute of Aeronautics and Astronautics, 2017, pp. 1-15.
Huawei et al., "Mobility enhancement for Drones", 3GPP, Meeting #98, R2-1704997, May 15-19, 2017, 6 pages.
Huawei et al., "Potential enhancements for drones", 3GPP, Meeting #89, R1-1707016, May 15-19, 2017, 4 pages.

(56) References Cited

OTHER PUBLICATIONS

IEEE Standard for Information technology, "Part 11: Wireless LAN Medium Access Control (MAC) and Physical Layer (PHY) Specifications", IEEE Computer Society, Mar. 2012, 2793 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
KDDI Corporation, "Field measurement results for drone LTE enhancement", Meeting 88bis, R1-1705823, Apr. 3-7, 2017, 6 pages.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP, Meeting #98, R2-1705660, May 15-19, 2017, 2 pages.
Mavlink, "Mavlink Common Message set specifications", available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", 2015, 114 pages.
Qualcomm, LTE Unmanned Aircraft Systems, Qualcomm Technologies, Inc., Trial Report, v1.0.1, May 12, 2017, 65 pages.
Ruano et al., "Augmented Reality Tool for the Situational Awareness Improvement of UAV Operators", Sensors, vol. 17, 2017, 16 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Wikipedia, "Global Positioning System", available online at <https://en.wikipedia.org/w/index.php?title=Global_Positioning_System&oldid=917890871>, Sep. 26, 2019, 21 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.

\* cited by examiner

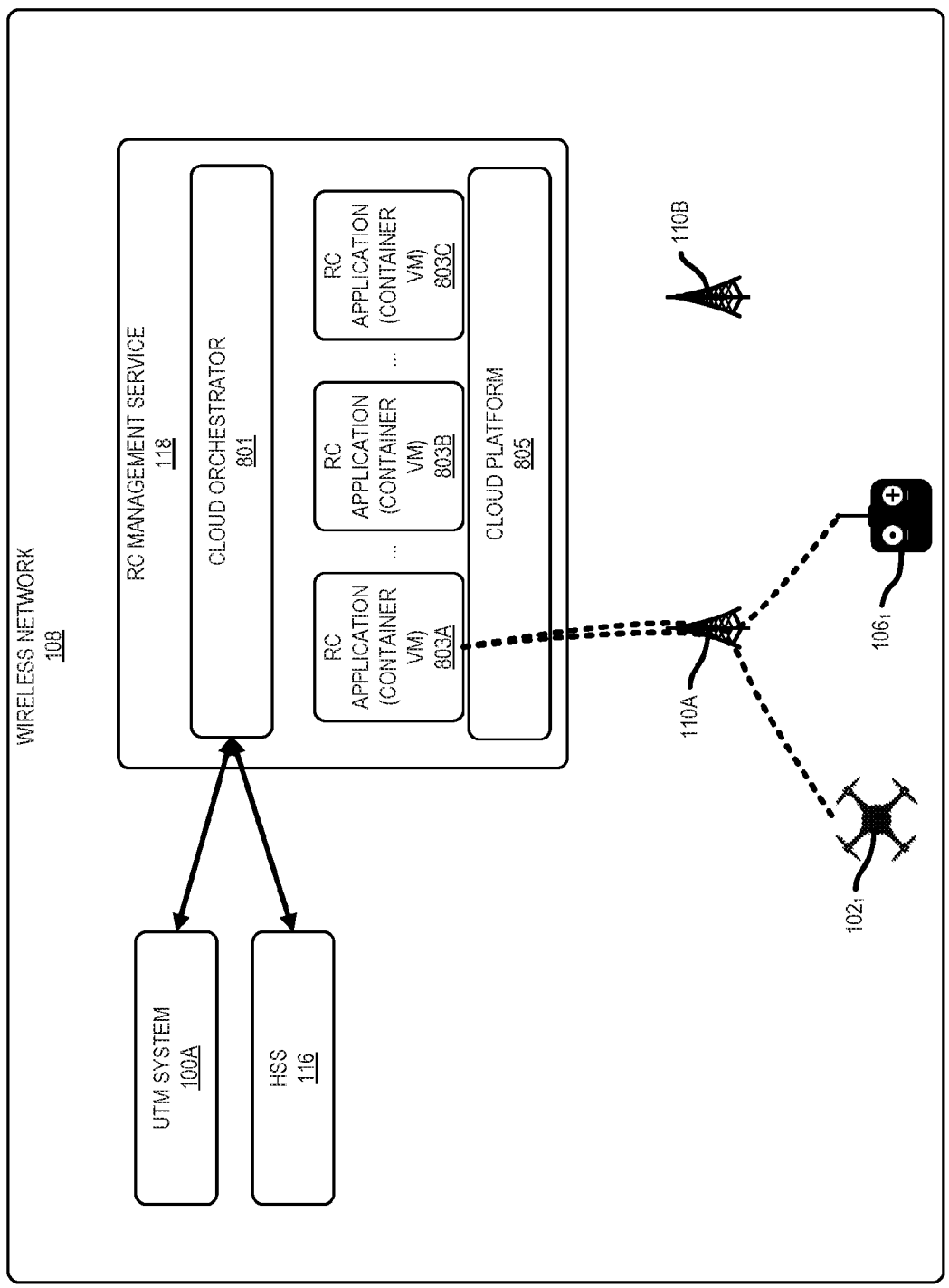

USING A CELLULAR INTERFACE FOR UNMANNED AERIAL VEHICLE COMMUNICATIONS

CROSS-REFERENCE TO RELATED APPLICATIONS

This application is a National stage of International Application No. PCT/IB2017/058525, filed Dec. 29, 2017, which is hereby incorporated by reference.

FIELD

Embodiments of the invention relate to the field of controlling Unmanned Aerial Vehicles (UAVs); and more specifically, to managing connections between UAVs and associated UAV devices, including radio controllers, using cellular services.

BACKGROUND

There is increasing interest in using Unmanned Aerial Vehicles (UAVs) for a wide variety of applications throughout society. Examples include delivery services, aerial photography and film making, remote sensing tasks for agriculture, city planning, civil engineering, support for public safety and rescue services, and much more. Common to these use cases are that they each make use of remote-controlled UAVs that operate at low altitudes (in comparison to larger aircraft) and often above urban areas. In some scenarios, a UAV is manually flown by a UAV operator while in other scenarios a UAV engages in fully or partially autonomous flight where a UAV operator may be monitoring multiple aircraft simultaneously and intervening only when issues arise.

When some level of control is being asserted by a UAV operator or otherwise by a ground based controller, a control channel is needed between the UAV and the controller for controlling the flight of the UAV. Typically, this control channel is implemented through the use of a radio controller that operates with a line-of-sight control interface. This line-of-sight control interface/channel allows for control of UAVs over an operating distance (dictated by transmission constraints of the interface/channel) and while obstructions are not present between the UAV and the radio controller. Once the UAV extends beyond the operating distance of the line-of-sight control interface, the UAV is forced to fly without controller/operator input. In addition, since traditional UAV radio controllers use analog radio signals, only simple/low-bandwidth instructions (e.g., servo commands) can be communicated over the line-of-sight control interface/channel. Further, although some UAVs allow for communication of telemetry data and video/image data, each of these types of data are communicated over separate line-of-sight interfaces/channels (e.g., separate telemetry interface/channel and video/image interface/channel) that are marred by the same issues as the control interface/channel.

SUMMARY

A method for managing connections between an Unmanned Aerial Vehicle (UAV) and one or more associated UAV devices is described. The method includes determining, by a radio control management service, that one or more associated UAV devices are attached to a wireless network; determining, by the radio control management service, that one or more UAVs are attached to the wireless network; and routing, by the radio control management service in response to determining that the one or more associated UAV devices and one or more UAVs are attached to the network, at least one of (1) communications from at least one of the one or more UAVs to at least one of the one or more associated UAV devices and (2) communications from at least one of the one or more associated UAV devices to at least one of the one or more UAVs.

The methods, systems, and devices described herein may facilitate the use of a wireless cellular network (e.g., a 3rd Generation Partnership Project (3GPP) system)) to connect UAVs and associated UAV devices (e.g., radio controllers and/or telemetry computers). In particular, to allow streamlined use of the wireless cellular network with UAVs and associated UAV devices, a radio control (RC) management service may be employed to intelligently route communications between UAVs and associated UAV devices attached to the wireless cellular network. In comparison to traditional line-of-sight connections that are characterized by low bandwidth and inconsistent transmission quality and range, cellular networks provide high bandwidth for the transmission of large volumes of data (e.g., telemetry, video, and image data and/or complex flight commands) and consistent, long-range coverage.

BRIEF DESCRIPTION OF THE DRAWINGS

The invention may best be understood by referring to the following description and accompanying drawings that are used to illustrate embodiments of the invention. In the drawings:

FIG. 9A shows a first UAV and a first associated UAV device communicating via an RC application according to one embodiment;

DESCRIPTION OF EMBODIMENTS

Figure 1:
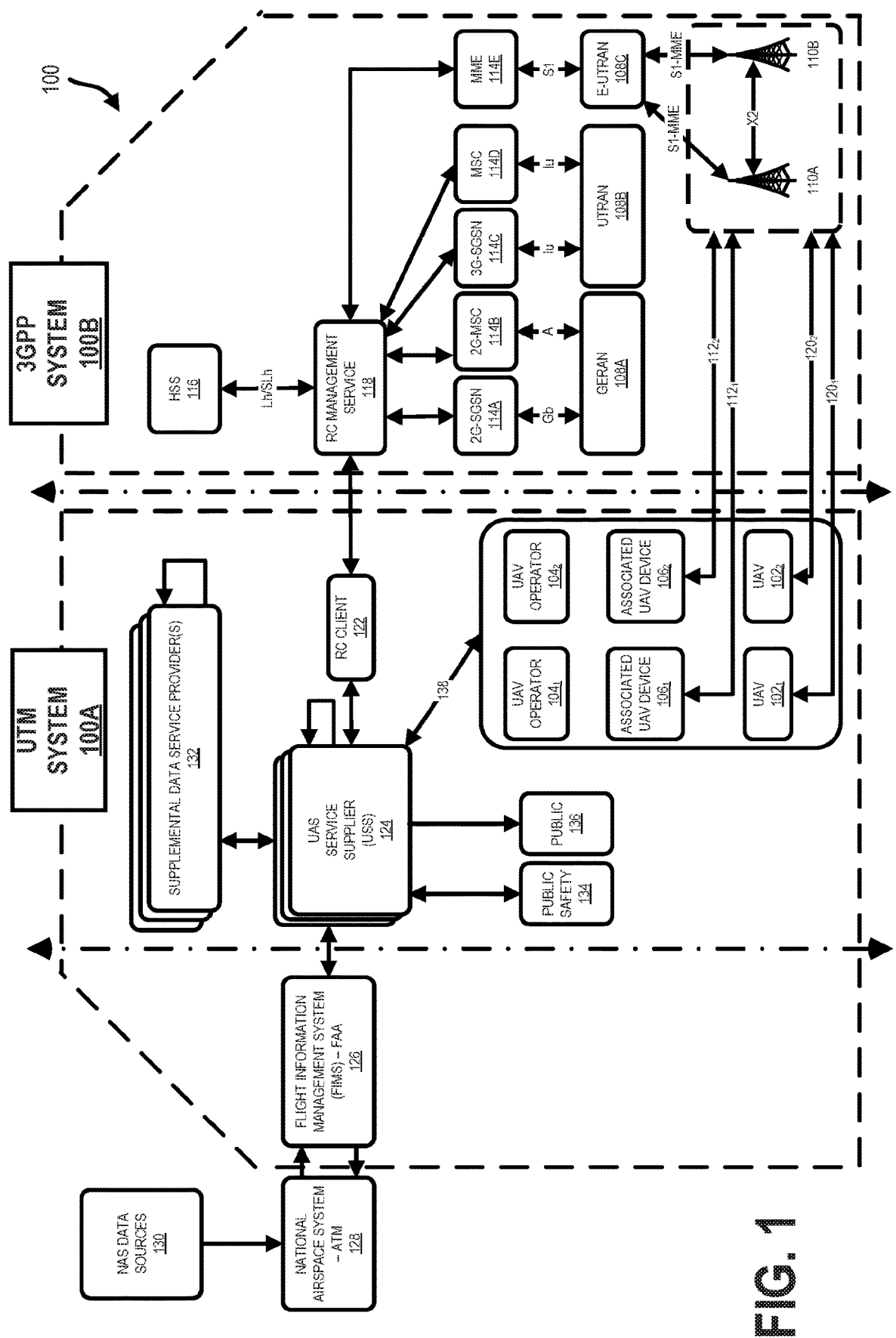
FIG. 1 illustrates an air traffic system, including an Unmanned Aerial Vehicle (UAV) Traffic Management (UTM) system and a 3rd Generation Partnership Project (3GPP) system, according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system according to one embodiment is presented herein that utilizes cellular networks to allow for the control and operation of Unmanned Aerial Vehicles (UAVs). For example, in one embodiment, an associated UAV device (e.g., a radio controller), which is used for controlling the flight of a UAV, may include a cellular interface (e.g., a 3rd Generation Partnership Project (3GPP) interface) that may communicate with a UAV over a cellular network via a corresponding cellular interface in the UAV. To facilitate the connection between the cellular interface in the associated UAV device and the cellular interface in the UAV, a radio control management service may be present in the cellular network that links UAVs with corresponding associated UAV devices as each attaches to the cellular network. As will be described in greater detail below, the radio control management service facilitates the use of cellular networks for UAV communications, which will expand the reach of control exerted on UAVs, reduce influence of environment and obstructions on communications with UAVs, and increase bandwidth for UAV related data (e.g., control and telemetry data).

Turning now to FIG. 1, an air traffic system 100 will be described for managing a UAV 102, according to one embodiment. The air traffic system 100 may be used for managing the flights of one or more UAVs 102 that are controlled/operated/piloted by corresponding UAV operators 104 via associated UAV devices 106. In some embodiments, in addition to or in lieu of controlling the UAVs 102, the associated UAV devices 106 may be used for receiving/managing data from the UAVs 102 (e.g., telemetry, pictures, video, etc.). The UAVs 102 may be interchangeably referred to as Unmanned Aircraft Systems (UASs) or drones throughout this description. The air traffic system 100 may be divided into two logical portions: a UAV Traffic Management (UTM) system 100A and a 3GPP system 100B. In this configuration, the UTM system 100A manages flight plan information and the 3GPP system 100B provides network services to UAVs 102 and associated UAV devices 106.

In some embodiments, the UAVs 102 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 102 larger than fifty-five pounds and/or UAVs 102 that are designed to fly above 400 feet.

The UAVs 102 are aircraft without an onboard human controller. Instead, the UAVs 102 may be operated/piloted using various degrees of autonomy. For example, a UAV 102 may be operated by a human (e.g., the UAV operator 104) located on the ground or otherwise removed and independent of the location of the UAV 102. For example, a UAV operator 104 may be located on the ground and acts to directly control each movement of a UAV 102 or a group of UAVs 102 through an associated UAV device 106 (e.g., a radio controller) via one or more inputs of the associated UAV device 106 (e.g., joystick, buttons, switches, etc.). In this embodiment, the UAV operator 104 may transmit commands via the associated UAV device 106 to cause the UAV 102 to adjust/move particular flight instruments (e.g., flaps, blades, motors, etc.) for the purpose of following a flight plan or another set of objectives. In other scenarios, the UAV operator 104 may provide a flight plan to the UAV 102. In response to the flight plan, the UAV 102 may adjust/move particular flight instruments to fulfill objectives of the flight plan. In these embodiments, a human operator (e.g., the UAV operator 104) may monitor the progress of the flight plan and intervene as needed or as directed via the associated UAV device 106.

Figure 2:
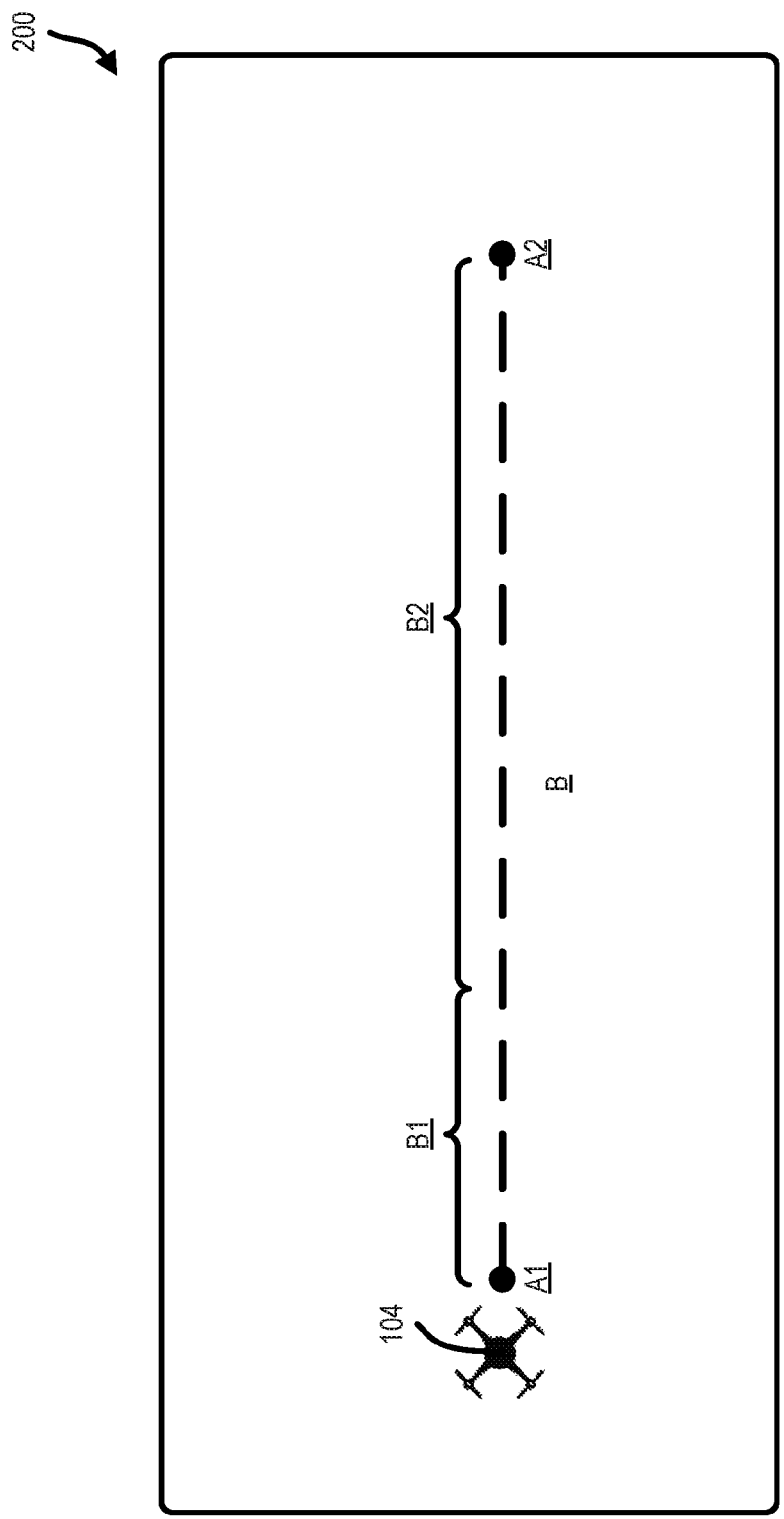
FIG. 2 illustrates an example flight plan with a set of coordinates according to one embodiment.

A flight plan may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2 indicates that the UAV 102 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 102 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 102 (e.g., altitude limitations above 400 feet and velocity limitations above 100 miles/hour).

Figure 3:
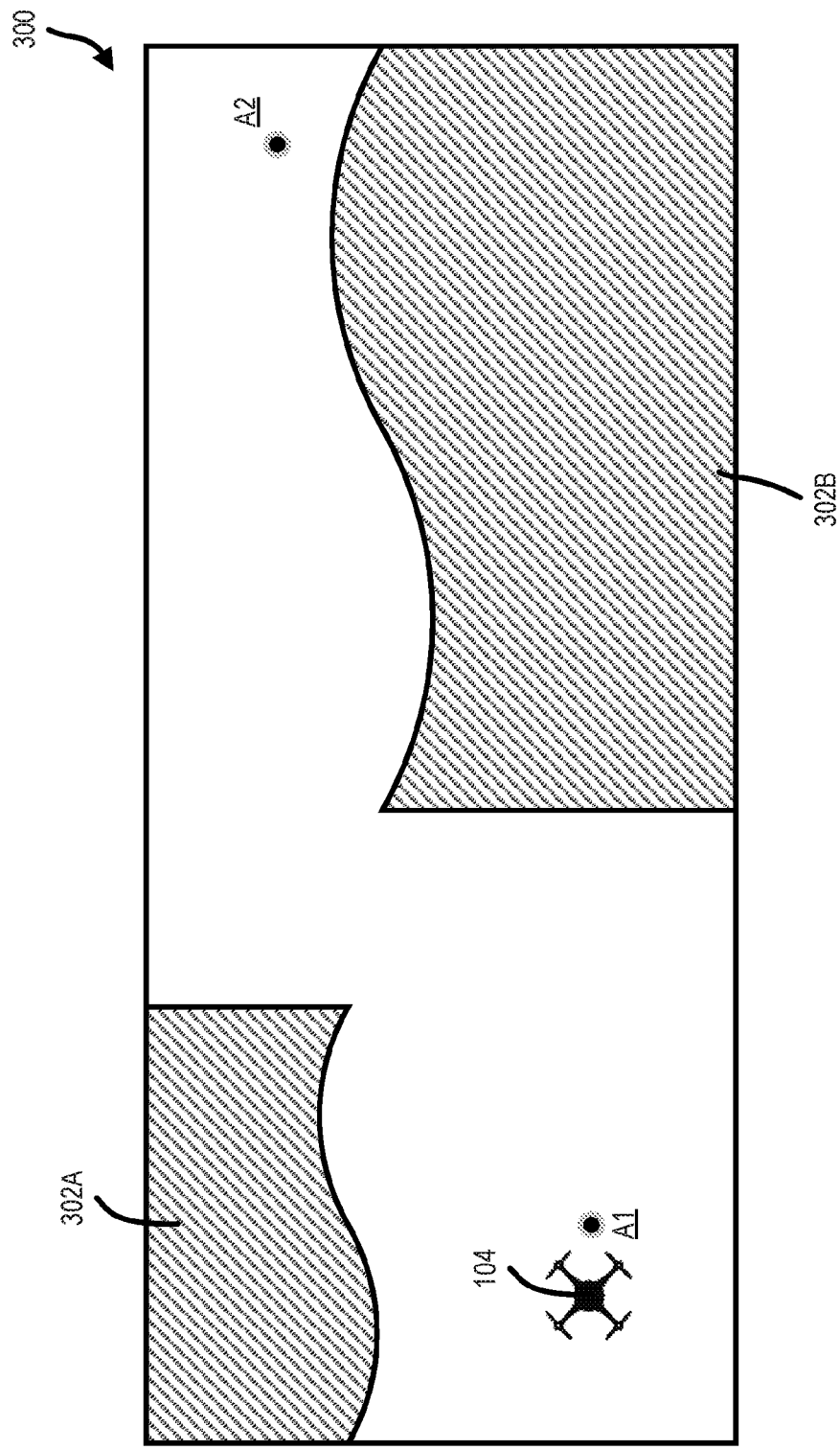
FIG. 3 illustrates an example flight plan with a set of restricted areas/zones according to one embodiment.

In another example, as shown in FIG. 3, a flight plan 300 may indicate that the UAV 102 is to take off from location A1, travel to location A2, and avoid a set of restricted zones 302A and 302B. In this example, the UAV 102 is directed to reach the target location A2 without entering the set of restricted zones 302A and 302B. The restricted zones may be relative to geographical location (defined by a set of coordinates), an altitude, and/or a velocity. For example, the UAV 102 may be permitted to enter restricted zone 302A but only at a prescribed altitude and/or only at a prescribed velocity.

Figure 4:
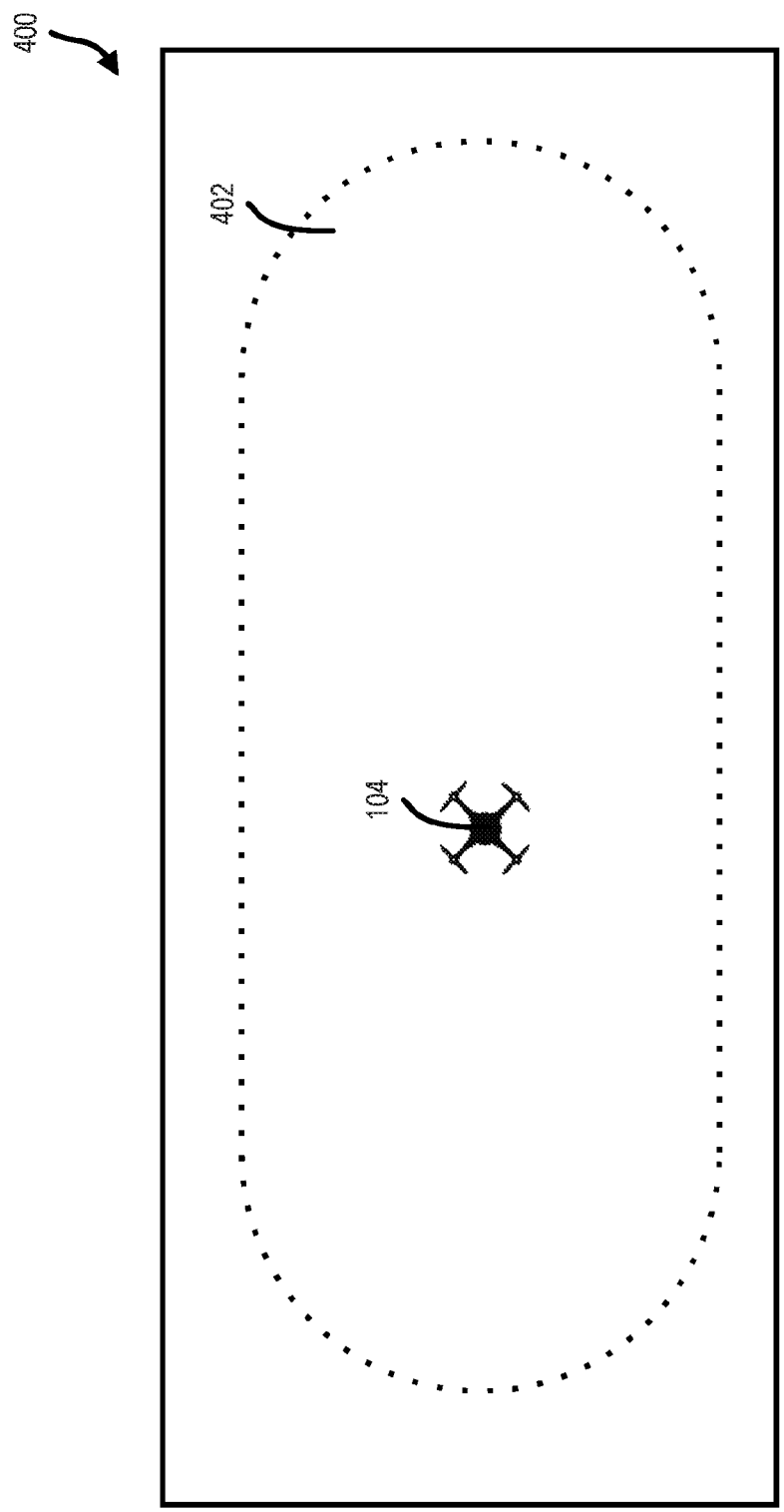
FIG. 4 illustrates an example flight plan with a designated clearance zone according to one embodiment.

In still another example, shown in FIG. 4, a flight plan 400 may provide clearance for the UAV 102 to fly in a designated clearance zone 402. The clearance zone 402 may be a confined area associated with an altitude range (e.g., between 400-500 feet) and/or an expiration/duration (e.g., an expiration of 11:40 PM). In this example, the UAV 102 may fly anywhere in the designated clearance zone 402 until the clearance has expired.

Although the flight plans described above are provided in relation to diagrams, flight plans may be encoded/presented using any format. For example, a flight plan may be represented and passed to the UAV 102 using an extensible markup language (XML) based format or another encoding or representation that is decodable and parseable by a machine. As noted above, flight plans may be followed via a UAV operator 104 interacting with an associated UAV device 106 (e.g., a radio controller) and/or via some level of autonomy on the part of the UAV 102. In some embodiments, as will be described in greater detail below, a portion of the 3GPP system 100B may operate to control the UAV 102 independent of the associated UAV device 106 through issuance of control commands to the UAV 102 over the 3GPP system 100B.

Figure 5:
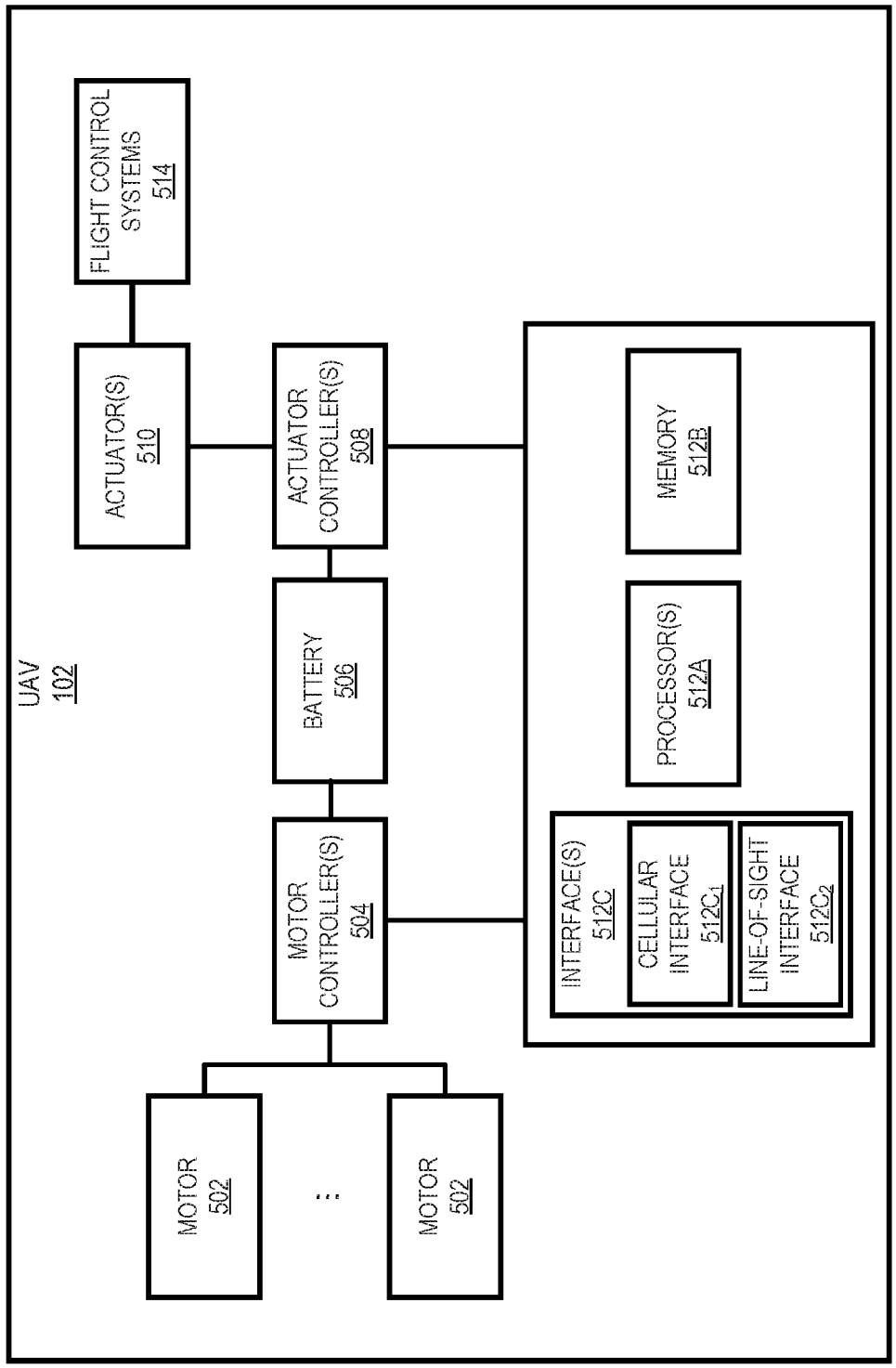
FIG. 5 illustrates a block diagram of a UAV according to one embodiment.

FIG. 5 shows a block diagram of a UAV 102 according to one example embodiment. Each element of the UAV 102 will be described by way of example below and it is understood that each UAV 102 may include more or less components than those shown and described herein.

As shown in FIG. 5, a UAV 102 may include a set of motors 502 controlled by one or more motor controllers 504, which control the speed of rotation of the motors (e.g., rounds per minute). As used herein, the term engine may be used synonymously with the term motor and shall designate a machine that converts one form of energy into mechanical energy. For example, the motors 502 may be electrical motors that convert electricity stored in the battery 506 into mechanical energy. The UAV 102 may include any number of motors 502 that are placed in any configuration relative to the body and/or an expected heading of the UAV 102. For example, the motors 502 may be configured such that the UAV 102 is a multirotor helicopter (e.g., a quadcopter). In other embodiments, the motors 502 may be configured such that the UAV 102 is a fixed wing aircraft (e.g., a single engine or dual engine airplane). In these embodiments, the motors 502, in conjunction with other elements of the UAV 102 serve to keep the UAV 102 in flight and/or propel the UAV 102 in a desired direction. In some embodiments, the UAV 102 may not include motors 502 for propelling the UAV 102 forward. In this embodiment, the UAV 102 may be a glider or lighter than air craft (e.g., a weather balloon).

As noted above, the motors 502 are controlled by one or more motor controllers 504, which govern the speed of rotation of each motor 502. In one embodiment, the motor controllers 504 may work in conjunction with actuator controllers 508 and actuators 510 that control the pitch/angle/rotation of propellers, flaps, slats, slots, rotors, rotor blades/wings, and other flight control systems 514. The motor controllers 504 and actuator controllers 508 may be managed/controlled by one or more processors 512A that are communicatively coupled to a memory 512B and one or more interfaces 512C.

In some embodiments, the memory 512B may store instructions that when executed by the processors 512A cause the UAV 102, via adjustments to settings/parameters of the motor controllers 504 and actuator controllers 508, to move in a particular direction (vertical or horizontal) or maintain a particular flight pattern (e.g., hover at a particular altitude).

The UAV 102 may communicate with one or more other devices using the one or more interfaces 512C. In one embodiment, one of the interfaces 512C in the UAV 102 may comply with a cellular protocol. For example, the cellular interface $512C_1$ may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In one embodiment, one of the interfaces 512C in a UAV 102 may comply with a line-of-sight radio protocol. For example, the line-of-sight interface $512C_2$ may adhere to one or more line-of-sight radio protocols, including the Micro Air Vehicle Link (MAVLink) protocol that operates in a point-to-point connection with an associated UAV device 106 (e.g., a radio controller and/or a telemetry computer). In a line-of-sight network, two network elements are entirely dependent on a clear line-of-sight between them to maintain a network connection. Obstacles or interference that prevent such line-of-sight reduces (in the case of a near line-of-sight connection) or prevents the transfer of data between the network elements. Further, since it is difficult to estimate the environment in which network elements will be used, it is equally difficult to estimate operating distances using line-of-sight interfaces and connections. Accordingly, line-of-sight connections are often limited to several kilometers. In contrast, a cellular network does not rely on the network elements maintaining a line-of-sight with each other and each network element may instead connect with any number of network devices (e.g., cells) to facilitate the transfer of data to the other network element. Thus, cellular networks permeate the landscape and are not constrained by a line-of-sight or a distance between network elements (i.e., cellular networks are able to provide beyond-line-of-sight communications). In some cases, the bandwidth of a cellular connection may be sacrificed to provide a longer distance communication channel between a network element and a piece of infrastructure (e.g., between a UAV 102 and a cell 110).

Figure 6:
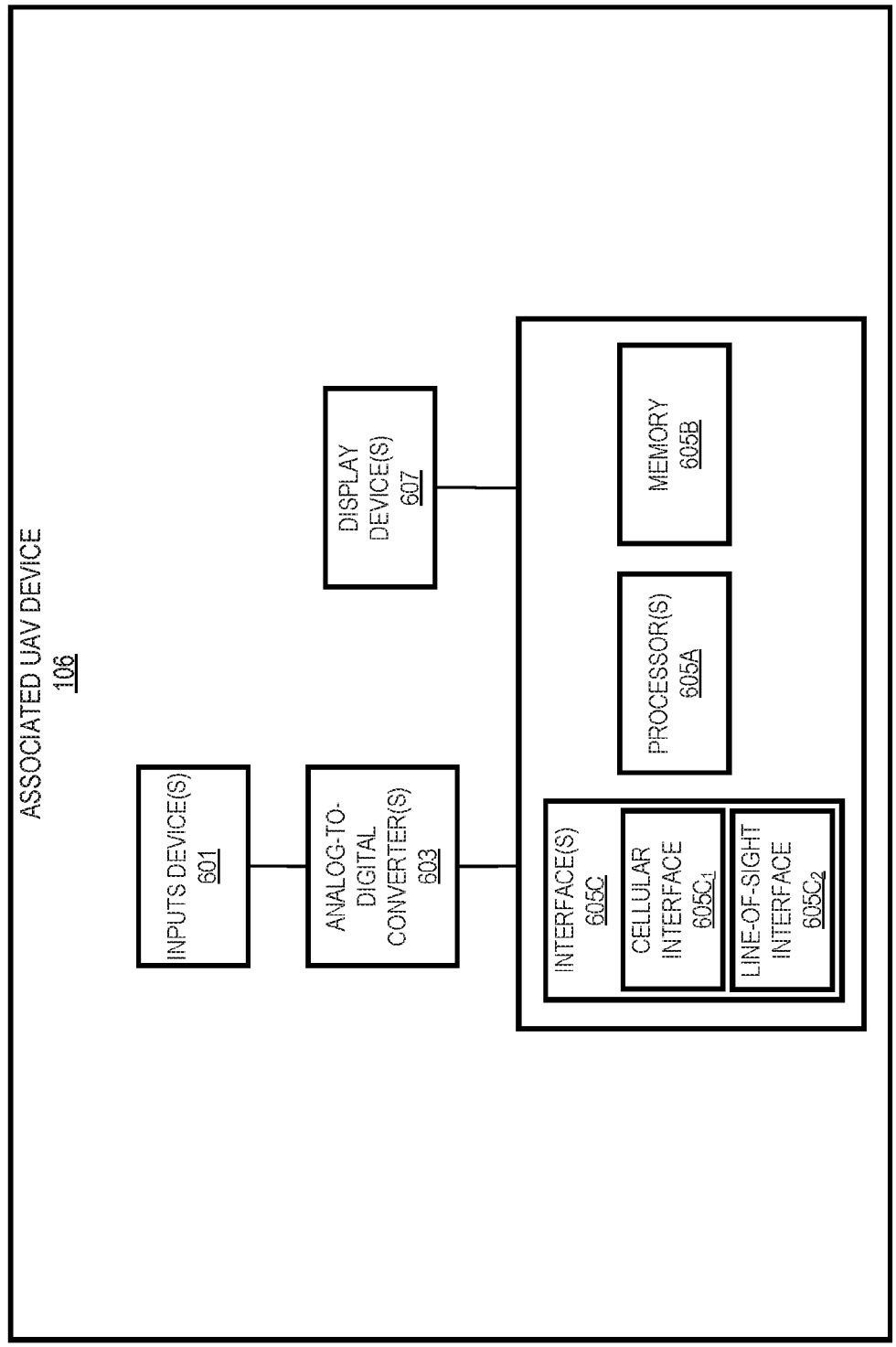
FIG. 6 illustrates a block diagram of an associated UAV device according to one embodiment.

FIG. 6 shows an associated UAV device 106 according to one embodiment. As shown in FIG. 6, the associated UAV device 106 may include one or more input devices 601. The one or more input devices 601 may allow a UAV operator 104 to input commands for controlling a UAV 102 (e.g., when the associated UAV device 106 is a radio controller) or for managing data received from the UAV 102 (e.g., when the associated UAV device 106 is a telemetry/media collecting computer). The input devices 601 may include one or more of a joystick, set of up-down-left-right arrows, a mouse, a keyboard, buttons, switches, or any similar input mechanisms. A set of one or more analog-to-digital converters 603 may convert analog signals produced by the one or more input devices 601 into digital signals for processing by one or more processors 605A based on instructions stored on memory 605B.

Similar to the UAV 102, the associated UAV devices 106 may communicate with one or more other devices using the one or more interfaces 605C. In one embodiment, one of the interfaces 605C in the associated UAV device 106 may comply with a cellular protocol. For example, the cellular interface $605C_1$ may adhere to one or more of GSM (including GPRS and EDGE), UMTS (including HSPA), and LTE. In one embodiment, one of the interfaces 605C in the associated UAV device 106 may comply with a line-of-sight radio protocol. For example, the line-of-sight interface $605C_2$ may adhere to one or more line-of-sight radio protocols, including the MAVLink protocol that operates in a point-to-point connection with a UAV 102.

In one embodiment, the UAV 102 and the associated UAV device 106 may operate in the GSM EDGE Radio Access Network (GERAN) 108A, the Universal Terrestrial Radio Access Network (UTRAN) 108B, and/or the Evolved Universal Mobile Telecommunications System (UMTS) Terrestrial Radio Access Network (E-UTRAN) 108C of the 3GPP system 100B using one or more of the interfaces 512C and 605C (e.g., the cellular interface $512C_1$ and the cellular interface $605C_1$). The GERAN 108A, the UTRAN 108B, and/or the E-UTRAN 108C may be administered by a network operator (e.g., a cellular network operator) and the UAV 102 and the associated UAV device 106 may be subscribers to one or more of these networks 108A, 108B, and 108C. The GERAN 108A, the UTRAN 108B, and the E-UTRAN 108C may hereinafter be individually be referred to as a wireless network 108, a cellular network 108, a wireless cellular network 108, an access network 108, or a wireless access network 108 and may be collectively referred to as wireless networks 108, cellular networks 108, wireless cellular networks 108, access networks 108, or wireless access networks 108.

The GERAN 108A, the UTRAN 108B, and/or the E-UTRAN 108C may comprise various network devices. Each of the network devices may, in some embodiments, be electronic devices that can be communicatively connected to other electronic devices on the network (e.g., other network devices, user equipment devices (such as UAVs 102 and associated UAV devices 106), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an enhanced NodeB (eNodeB) in Long-Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to as cells (e.g., the cells 110A and 110B), towers, cellular towers, or the like.

As shown in FIG. 1, each associated UAV device 106 may be connected to the GERAN 108A, the UTRAN 108B, and/or the E-UTRAN 108C via a corresponding connection 112 with a cell 110. For example, the associated UAV device $106_1$ may attach to the GERAN 108A, the UTRAN 108B, and/or the E-UTRAN 108C via the connection $112_1$ with one of the cells 110A and 110B and the associated UAV device $106_2$ may attach to the GERAN 108A, the UTRAN 108B, and/or the E-UTRAN 108C via the connection $112_2$ with one of the cells 110A and 110B.

Similarly, each UAV 102 may be connected to the GERAN 108A, the UTRAN 108B, and/or the E-UTRAN 108C via a corresponding connection 120 with a cell 110. For example, the UAV $102_1$ may attach to the GERAN 108A, the UTRAN 108B, and/or the E-UTRAN 108C via the connection $120_1$ with one of the cells 110A and 110B and the UAV $102_2$ may attach to the GERAN 108A, the UTRAN 108B, and/or the E-UTRAN 108C via the connection $120_2$ with one of the cells 110A and 110B.

These connections 112 and 120 assist the UAVs 102 and the associated UAV devices 106 to communicate with each other. For example, the UAV $102_1$ may communicate telemetry/video/image data via the connection $120_1$ and the associated UAV device $106_1$ may receive this telemetry/video/image data via the connection $112_1$. In another example, the associated UAV device $106_2$ may communicate control commands (e.g., individual commands or a flight plan) via the connection $112_2$ and the UAV $102_2$ may receive the control commands via the connection $120_2$.

In one embodiment, the UAV operator 104 may maintain a connection with other elements of the UTM system 100A. For example, the UAV operator 104 may maintain connection 138 with a UAS Service Supplier (USS) 124. In some embodiments, the connection 138 may be a point-to-point connection while in other embodiments the connection 138 may be part of a distributed network. In one embodiment, the connection 138 is separate from the access networks GERAN 108A, UTRAN 108B, and E-UTRAN 108C while in other embodiments the connection 138 is part of one of the access networks GERAN 108A, UTRAN 108B, and E-UTRAN 108C.

In one embodiment, the connection 138 allows the UAV operator 104 to transmit data to or receive data from the USS 124 regarding a current, past, or future flight. For instance, the connection 138 may allow the UAV operator 104 to convey to the USS 124 one or more of the following: airspace information, alarms and notifications, authentication/authorization (e.g., use of a subscriber identification module (SIM) based identity to check UAV 102 and pilot/UAV operator 104 registrations and authorizations), and reports and logs (e.g., to establish liability in case of accidents).

In some embodiments, the UAV operator 104 may transmit a proposed flight plan to the USS 124 via the connection 138. In one embodiment, the UTM system 100A may include a plurality of USSs 124. The set of USSs 124 may alternatively be referred to as a USS network. Each USS 124 offers support for safe airspace operations based on information received from a set of stakeholders and other information sources. The USSs 124 may share information about their supported operations to promote safety and to ensure that each USS 124 has a consistent view of all UAV 102 operations and thus enable the UAV 102 to stay clear of each other.

As noted above, the USSs 124 may receive information from a variety of stakeholders and information sources such that the USSs 124 may determine whether a proposed flight plan is authorized to proceed. For example, the Federal Aviation Association (FAA) may provide directives and constraints to the USSs 124 via the Flight Information Management System (FIMS) 126. The FIMS 126 provides administration officials a way to issue constraints and directives to the UAV operators 104 and/or the UAV 102 via a USS 124. Such constraints and directives may be based on information received from the National Airspace System (NAS) Air Traffic Management (ATM) system 128 and/or other NAS data sources 130. In this example, the ATM system 128 could be used to mark certain restricted areas (e.g., airports and military bases) for the UAV 102 or restrict flights over forest fire areas or other spaces which are normally permitted for the UAV 102. In addition to the airspace state and other data provided by the ATM system 128 and other NAS data sources 130, the FIMS 126 may provide impact data, which may describe effects caused by the UAV 102 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 126, the USSs 124 may receive data from supplemental data service providers 132. These supplemental data service providers 132 may provide various pieces of data that are used by the USSs 124 in planning and authorizing a flight plan, including terrain, weather, surveillance, and performance information. The supplemental data service providers 132 may communicate amongst each other to insure consistency and accuracy of information. In some embodiments, the supplemental data service providers 132 may provide data that is presented/transmitted to UAV operators 104 via the USS 124 for the planning of a flight plan/mission.

In some embodiments, the USSs 124 may receive constraints from public safety sources 134. This information may limit UAV 102 missions over areas when such flights may negatively affect public safety. For example, UAV 102 missions may be limited over areas that are currently hosting events with large crowds of people. In some embodiments, the public safety sources 134 may provide data that is presented/transmitted to UAV operators 104 via the USS 124 for the planning of a flight plan/mission. The USSs 124 may also make UAV 102 flight/operation information available to the public 136.

As noted above, the USS 124 may determine if a proposed flight plan is authorized in view of directives, constraints, and information received from various stakeholders/sources. After concluding that the proposed flight plan is authorized or not authorized to proceed, the USS 124 may transmit a response to the UAV operator 104. In response to receiving an authorized flight plan, the UAV operator 104 may begin controlling the UAV 102 to effectuate the authorized flight plan or the UAV operator 104 may transmit the authorized flight plan or some set of instructions describing the objectives of the authorized flight plan to the UAV 102. Based on inputs from the UAV operator 104, the processor 512A together with instructions stored in the memory 512B may control the motor controllers 504 and/or actuators 510 to achieve the objectives of the flight plan.

To ensure that the UAV 102 does not deviate from the authorized flight plan, the USS 124 may make use of geographical location information (e.g., the current location of the UAV 102). In one embodiment, this location information may be received/accessed by the UTM system 100A from the 3GPP system 100B. The 3GPP system 100B may represent a service standardized by various organizations. For example, the 3GPP system 100B may be covered under Global System for Mobile Communications (GSM) and Universal Mobile Telecommunications Service (UMTS). As described herein, the 3GPP system 100B specifies network elements/entities, the functionalities of all elements/entities, interfaces for inter/intra element/entity communications, as well as messages used to implement positioning functionality in a network. The 3GPP system 100B may include access to location information, such as longitude and latitude coordinates, altitude, velocity, and direction/heading of a UAV 102. In one embodiment, the location information may be provided at a prescribed interval (e.g., every minute), upon request, or in response to an event (e.g., a UAV 102 entering a specified area).

As shown, the 3GPP system 100B may include a radio control (RC) management service 118 that serves as a gateway for the UTM system 100A to access the 3GPP system 100B. In particular, an RC client 122 of the UTM system 100A may access the 3GPP system 100B via the RC management service 118. As will be described in greater detail below, the RC management service 118 may facilitate connections between UAVs 102 and associated UAV devices 106. For example, upon a UAV 102 and an associated UAV device 106 connecting to a network (e.g., the access networks GERAN 108A, UTRAN 108B, and E-UTRAN 108C), the RC management service 118 may determine an association based on identifiers of the UAV 102 and the associated UAV device 106. In response to this determined association, the RC management service 118 may facilitate routing of communications between the UAV 102 and the associated UAV device 106 (e.g., control commands, telemetry data, video data, image data, etc.). In this fashion, the RC management service 118 ensures that UAVs 102 communicate with appropriate associated UAV devices 106 without undue configuration by the UAV 102 and/or the associated UAV device 106. In some embodiments, as will be described in greater detail below, the RC management service 118 may utilize RC applications that run within a virtual machine for managing communications of the UAVs 102 and/or associated UAV devices 106.

In one embodiment, the RC management service 118 may be communicatively coupled to various support services, including a Home Subscriber Server (HSS) 116. For example, the RC management service 118 may request information from the HSS 116 via the Lh or SLh interfaces. The HSS 116 may contain or have access to a master user database that supports network access. For example, the HSS 116 may contain or have access to subscription-related information (subscriber profiles) for performing authentication and authorization of users (e.g., authentication of an account associated with an interface 512C of the UAV 102 or an interface 605C of the associated UAV device 106). In some embodiments, the HSS 116 can provide information about the subscriber's location and Internet Protocol (IP) information. In some embodiments, the HSS 116 may function similarly to a GSM home location register (HLR) and/or an Authentication Centre (AuC).

In some embodiments, the UTM system 100A may request and receive network subscription information associated with a UAV 102 and/or an associated UAV device 106. In particular, since the 3GPP system 100B is network operator specific, the UTM system 100A must be aware of which network operator and what account is associated with a UAV 102 and/or an associated UAV device 106.

The RC management service 118 may send requests to various controllers 114 associated with separate access networks 108. In response to the requests, the controllers 114 coordinate and submit responses to the RC management service 118. In some embodiments, the RC management service 118 may communicate via one or more interfaces with a 2G Serving General Packet Radio Service (GPRS) Support Node (SGSN) 114A, a 2G Mobile services Switching Centre (MSC) 114B for a GSM EDGE Radio Access Network (GERAN) 108A. In this embodiment, the 2G-SGSN 114A may communicate with the GERAN 108A via the Gb interface and the 2G-MSC 114B may communicate with the GERAN 108A via the A interface. The 2G-SGSN 114A and the 2G-MSC 114B may manage charging/billing, location request management, authorization of location services, and general operation of location services for the GERAN 108A.

In some embodiments, the RC management service 118 may communicate via one or more interfaces with a 3G-SGSN 114C or an MSC server 114D for a Universal Terrestrial Radio Access Network (U IRAN) 108B. In this embodiment, the 3G-SGSN 114C and the MSC server 114D may communicate with the UTRAN 108B via the Iu interface. The 3G-SGSN 114C and the MSC server 114D may manage charging/billing, location request management, authorization of location services, and general operation of location services for the UTRAN 108B.

In some embodiments, the RC management service 118 may communicate via one or more interfaces with a Mobility Management Entity (MME) 114E of an Evolved Universal Mobile Telecommunications System (UMTS) Terrestrial Radio Access Network (E-UTRAN) 108C. In this embodiment, the MME 114E may communicate with the E-UTRAN 108C via the S1 interface. The MME 114E may manage charging/billing, location request management, authorization of the location services, and general operation of location services for the E-UTRAN 108C.

In some embodiments, one or more of the portions of the air traffic system 100 may be implemented through virtualization. For example, a cloud execution environment (e.g., one or more virtual machines or containers) may be used by the RC management service 118 to manage communications between UAVs 102 and associated UAV devices 106.

Although the 3GPP system 100B has been described in relation to only UAV 102, associated UAV device 106, and UAV operator 104, the 3GPP system 100B may also provide network services to other network devices. For example, the 3GPP system 100B may simultaneously provide network services to one or more UAVs 102, one or more associated UAV devices 106, and one or more cellular telephones. Further, although described in relation to 3GPP, the systems, methods, and devices described herein are not restricted to this type of cellular network. In other embodiments, different protocols and infrastructures may be used by the systems, methods, and devices described herein.

Figure 7:
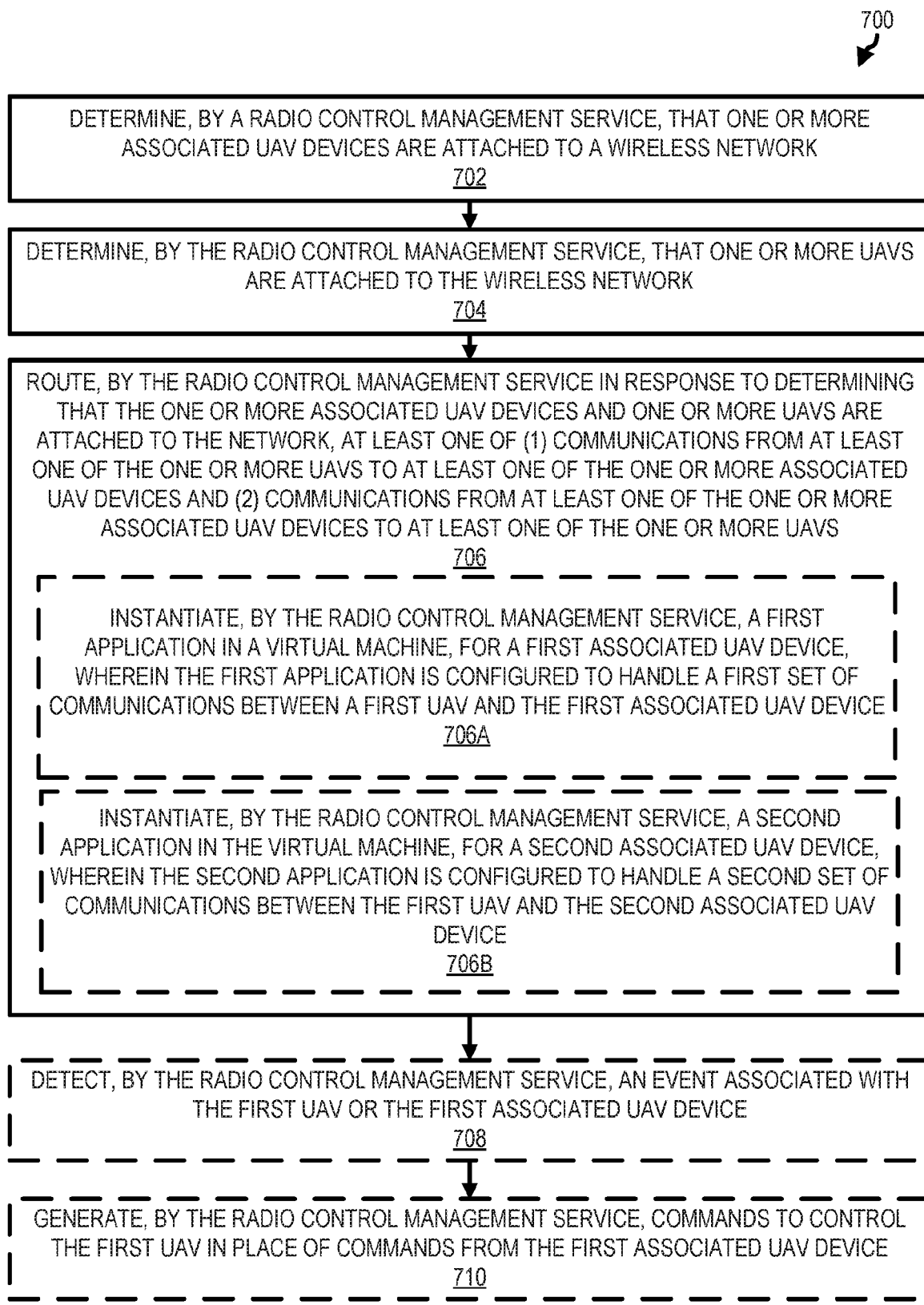
FIG. 7 illustrates a method for managing connections between one or more UAVs and one or more associated UAV devices according to one embodiment.

Turning now to FIG. 7, a method 700 for managing connections between one or more UAVs 102 and one or more associated UAV devices 106 according to one embodiment will be discussed. As will be described in greater detail below, the method 700 facilitates use of a cellular network with UAVs 102 and associated UAV devices 106 by automatically determining associations between UAVs 102 and associated UAV devices 106 and routing communications between UAVs 102 and associated UAV devices 106 based on the determined associations.

The operations in the diagram of FIG. 7 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 7 in a particular order, the operations of the method 700 are not restricted to this order. For example, one or more of the operations of the method 700 may be performed in a different order or in partially or fully overlapping time periods. Accordingly, the description and depiction of the method 700 is for illustrative purposes and is not intended to restrict to a particular implementation.

Each operation of the method 700 may be performed by one or more components of the air traffic system 100. For example, the operations of the method 700 may be performed by one or more of the RC management service 118, the RC client 122, the HSS 116, network controllers 114 (e.g., the MME 114E), UAVs 102, and/or associated UAV devices 106.

In one embodiment, the method 700 may commence at operation 702 with a determination that one or more associated UAV devices 106 are attached/connected to a wireless network 108. For example, the RC management service 118 may determine that the associated UAV device $106_1$ and/or the associated UAV device $106_2$ are attached to the E-UTRAN 108C at operation 702. In this example, the associated UAV device $106_1$ may be attached to the E-UTRAN 108C via the cell 110A and the associated UAV device $106_2$ may be attached to the E-UTRAN 108C via the cell 110B. Each of the associated UAV device $106_1$ and the associated UAV device $106_2$ may have been attached to the E-UTRAN 108C for any period of time prior to performance of operation 702 (e.g., seconds, minutes, hours, etc.). In one embodiment, the RC management service 118 may be signaled each time an associated UAV device 106 attaches to one of the access networks 108. For example, the MME 114E may signal the RC management service 118 each time an associated UAV device 106 attaches to the E-UTRAN 108C. Although the RC management service 118 is described as being separate from the controllers 114, in one embodiment, the RC management service 118 or the functionality of the RC management service 118 may be integrated in or embodied by one or more of the controllers 114 (e.g., the MME 114E). Integrating/embodying the functionality of the RC management service 118 allows the use of pre-existing interfaces and thus more efficient interoperability of the RC management service 118 in the 3GPP system 100B.

At operation 704, the method 700 may determine that one or more UAVs 102 are attached/connected to a wireless network 108. For example, the RC management service 118 may determine that the UAV $102_1$ and/or the UAV $102_2$ are attached to the E-UTRAN 108C at operation 704. In this example, the UAV $102_1$ may be attached to the E-UTRAN 108C via the cell 110A and the UAV $102_2$ may be attached to the E-UTRAN 108C via the cell 110B. Each of the UAV $102_1$ and the UAV $102_2$ may have been attached to the E-UTRAN 108C for any period of time prior to performance of operation 704 (e.g., seconds, minutes, hours, etc.). In one embodiment, the RC management service 118 may be signaled each time a UAV 102 attaches to one of the access networks 108. For example, the MME 114E may signal the RC management service 118 each time a UAV 102 attaches to the E-UTRAN 108C.

Although described and shown in FIG. 7 as operation 702 being performed before operation 704, the operations 702 and 704 may occur in a different order. For example, in one embodiment, operation 704 may be performed prior to operation 702, while in another embodiment operations 702 and 704 are performed in entirely or partially overlapping time periods. As noted above, in some embodiments, operations 702 and 704 may be performed after being signaled by controllers 114.

In one embodiment, the one or more UAVs 102 and/or the one or more associated UAV devices 106 may be attached to the wireless network 108 without providing the Internet or complete network access to these devices. In particular, since the one or more UAVs 102 and/or the one or more associated UAV devices 106 are focused on communications with each other, Internet and/or complete access to the wireless network 108 and other associated networks may not be provided.

At operation 706, the method 700 may route, in response to determining that the one or more associated UAV devices 106 and one or more UAVs 102 are attached to the wireless network 108, at least one of (1) communications from at least one of the one or more UAVs 102 to at least one of the one or more associated UAV devices 106 and (2) communications from at least one of the one or more associated UAV devices 106 to at least one of the one or more UAVs 102. For example, in one embodiment, one of the one or more associated UAV devices 106 is a radio controller that generates flight commands for one of the one or more UAVs 102. In this example, operation 706 may route the flight commands of the associated UAV device 106 to an interface (e.g., the cellular interface $512C_1$) of the one of the one or more UAVs 102. The flight commands are to cause the one of the one or more UAVs 102 to adjust one or more flight parameters to adjust movement of the one of the one or more UAVs 102.

In another example embodiment, one of the one or more associated UAV devices 106 is a telemetry device/computer that consumes telemetry data produced by one of the one or more UAVs 102. In this example, operation 706 routes the telemetry data from an interface (e.g., the cellular interface $512C_1$) of the one of the one or more UAVs 102 to the one of the one or more associated UAV devices 106.

Figure 8A:
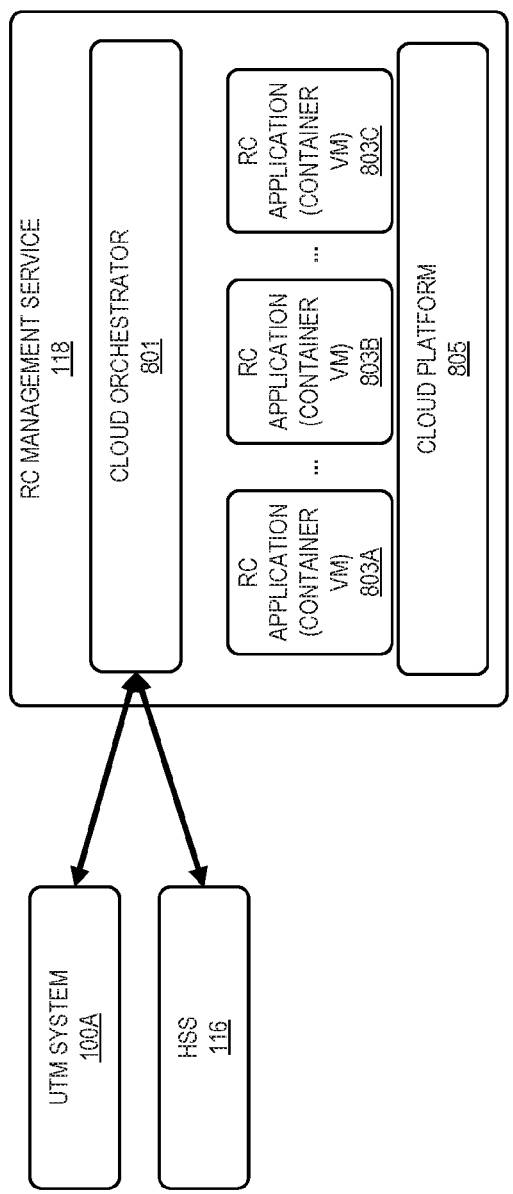
FIG. 8A illustrates an example of a radio control (RC) management service according to one embodiment.

In one embodiment, one or more applications may be used for handling/managing communications between UAVs 102 and associated UAV devices 106. For example, as shown in FIG. 8A, in some embodiments, the RC management service 118 may include a cloud orchestrator 801 for configuring one or more of the RC applications 803A-803C. In this configuration, the RC management service 118 may be deployed in an Infrastructure as a Service (IaaS), Platform as a Service (PaaS), or Software as a Service (SaaS) private or public cloud environment that communicates with the HSS 116 and/or the UTM system 100A (via the RC client 122) to authenticate and verify subscription information of UAVs 102 and associated UAV devices 106. Although shown with three RC applications 803, the RC management service 118 may include any number of RC applications 803. In one embodiment, the cloud orchestrator 801 may configure (e.g., provision, deploy, and/or start associated servers/computers; acquire and assign storage capacity; manage networking; create virtual machines; and gain access to specific software on cloud services) one or more RC applications 803. The cloud platform 805 may thereafter manage interactions of the RC applications 803 in corresponding virtual machines.

Figure 8B:
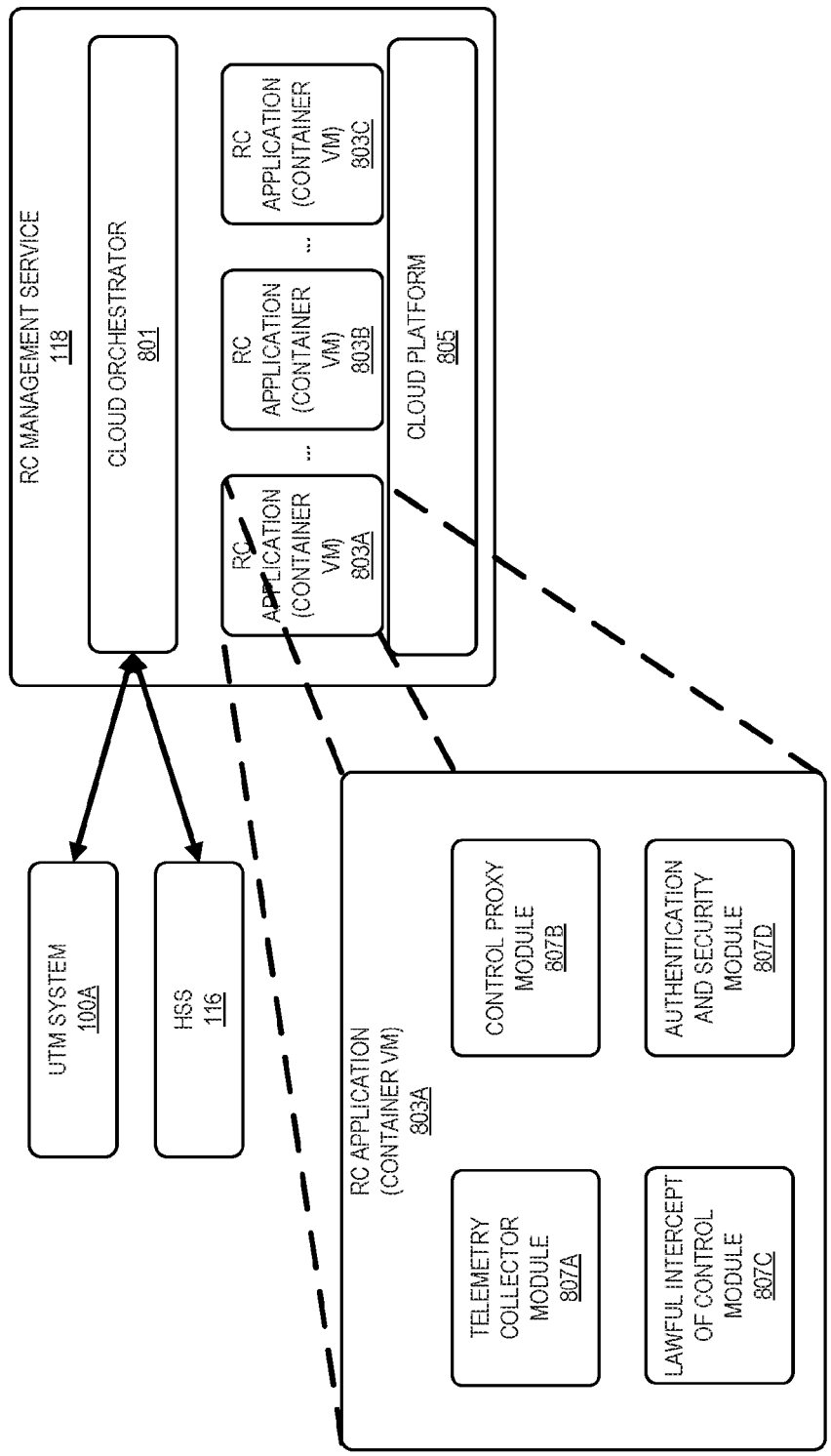
FIG. 8B illustrates an example set of modules that may be run in a virtual machine of a RC application according to one embodiment.

Each of the RC applications 803 may correspond to a different type of communications of a UAV 102 and/or an associated UAV device 106. FIG. 8B shows an RC application 803A according to one embodiment. As shown in FIG. 8B, the RC application 803A may include one or more of the modules 807A-807D. Each of the modules 807A-807D may be used for different types of communications. For example, a telemetry collector module 807A may be used for collecting, processing, and/or managing telemetry data (e.g., velocity, acceleration, location, etc. of a UAV 102 and/or latency, signal-to-noise ratio (SNR), and/or other characteristics of the connection 120). The control proxy module 807B may be used for controlling/managing a proxy connection for a UAV 102 and/or an associated UAV device 106. The lawful intercept of control module 807C may be used for controlling/managing commands from a law enforcement or other official when control of the UAV 102 has been transferred away from the original UAV operator 104 (e.g., the UAV operator 104 becomes a law enforcement official after the UAV 102 has entered into a restricted area (e.g., airspace of an airport or a stadium)). The authentication and security module 807D may be used for managing/controlling authentication and security related to the connection 112 or the connection 120 (e.g., ensure communications received by a UAV 102 are from an authorized associated UAV device 106 or ensure communications received by an associated UAV device 106 are from an authorized UAV 102). In one embodiment, each RC application 803 is instantiated with a single module 807 to handle a single type of communication while in other embodiments, an RC application 803 may be instantiated with multiple modules 807 such that the RC application 803 may handle multiple types of communications.

In one embodiment, routing of communications at operation 706 may be performed further in response to determining an association between one of the one or more associated UAV devices 106 determined to be attached to the wireless network 108 at operation 702 and one of the one or more UAVs 102 determined to be attached to the wireless network 108 at operation 704. For example, FIG. 9A shows the UAV $102_1$ connected to a wireless network 108 via the cell 110A and the associated UAV device $106_1$ connected to the wireless network 108 via the cell 110A. Upon determining that the associated UAV device $106_1$ is connected to the wireless network 108 at operation 702 and the UAV $102_1$ is connected to the wireless network 108 at operation 704, the RC management service 118 may determine whether the UAV $102_1$ and the associated UAV device $106_1$ are associated with each other. For instance, as shown in FIG. 9A, the associated UAV device $106_1$ is a radio controller that may be used to generate and transmit flight commands. In this example, the RC management service 118 may determine an association between the associated UAV device $106_1$ and the UAV $102_1$ such that flight commands from the associated UAV device $106_1$ may be routed to the UAV $102_1$ at operation 706.

Figure 9B:
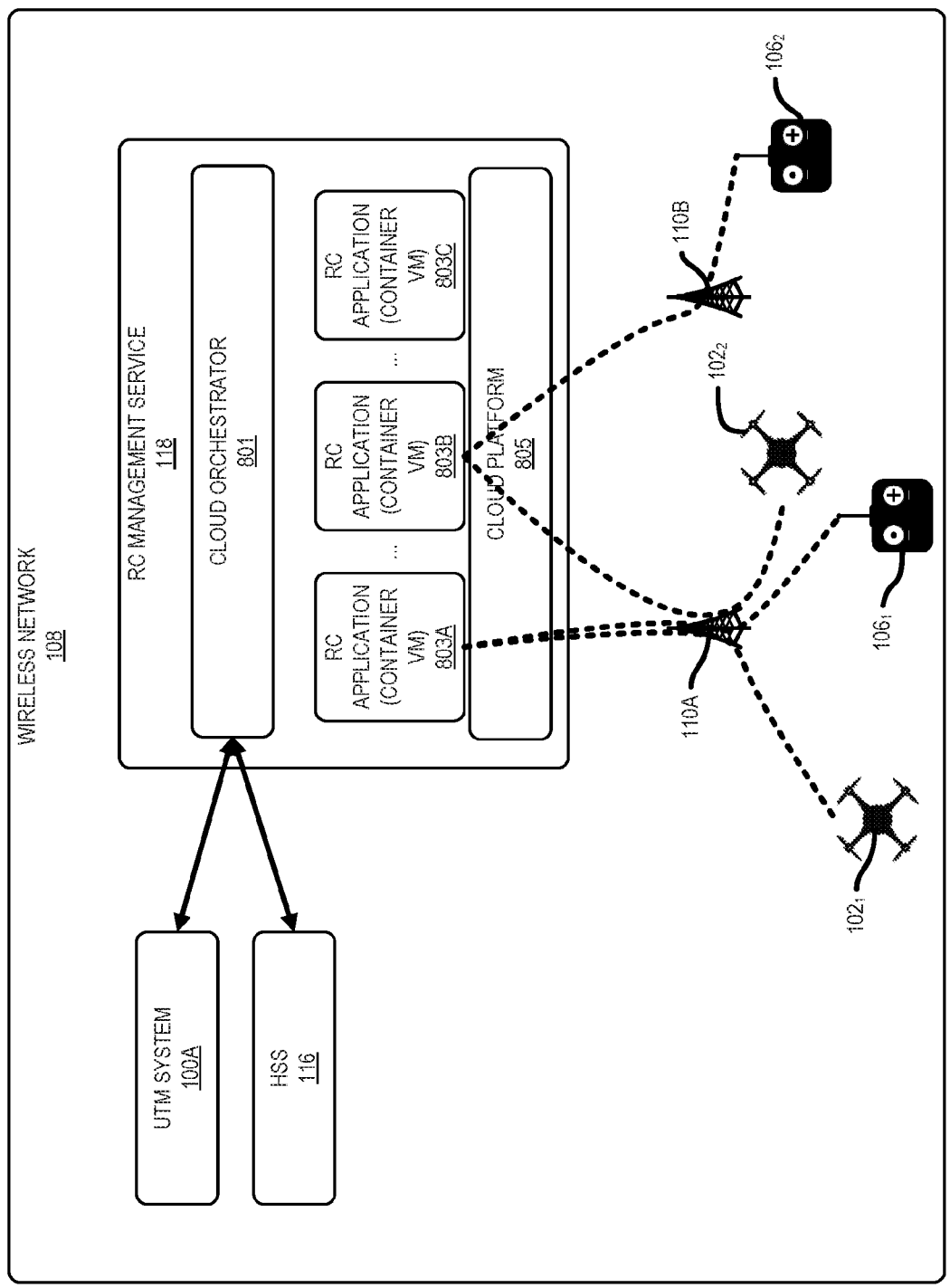
FIG. 9B shows a second UAV and a second associated UAV device communicating via an RC application according to one embodiment.

Similarly, FIG. 9B shows the associated UAV device $106_2$ that is connected to the wireless network 108 via the cell 110B and the UAV $102_2$ that is connected to the wireless network 108 via the cell 110A. In one example embodiment, the associated UAV device $106_2$ may be a radio controller that generates and transmits flight commands. In this example, the RC management service 118 may determine an association between the associated UAV device $106_2$ and the UAV $102_2$ such that flight commands from the associated UAV device $106_2$ may be routed to the UAV $102_2$ at operation 706. In one embodiment, since the UAV $102_2$ and the associated UAV device $106_2$ are connected to the wireless network 108 via separate cells 110A and 110B, respectively, the flight commands may be routed/tunneled between the cells 110A and 110B via an interface between the cells 110 (e.g., the X2 interface when the cells 110 are eNodeBs). The interface forms a mesh network between deployed cells 110 such that the UAV $102_2$ and the associated UAV device $106_2$ may maintain connectivity in the entire wireless network 108 and regardless of what cells 110 are used for attachment. In some embodiments, various tunneling protocols and systems may be used (e.g., GPRS Tunneling Protocol (GTP), Generic Routing Encapsulation (GRE), and Virtual Extensible Local Area Network (VXLAN)) to bridge communications between cells 110 in other access networks 108 and between different radio technologies (e.g., between GERAN 108A, UTRAN 108B, and E-UTRAN 108C).

Figure 9C:
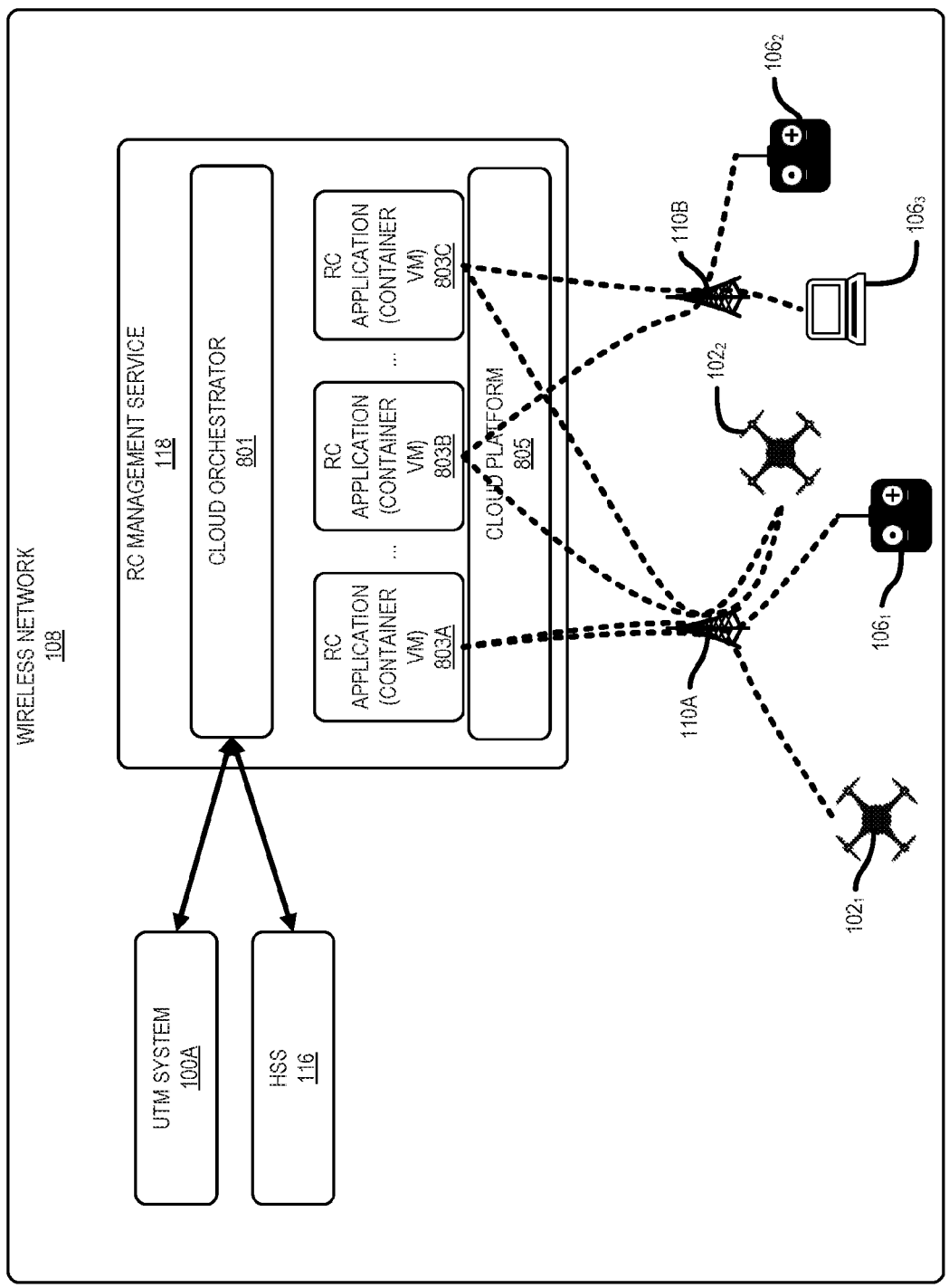
FIG. 9C shows the second UAV and a third associated UAV device communicating via an RC application according to one embodiment.

In some embodiments, multiple associated UAV devices 106 may be associated with a single UAV 102. For example, as shown in FIG. 9C, the associated UAV device $106_3$ may be connected to the wireless network 108 via the cell 110B. The associated UAV device $106_3$ may be a telemetry computer that collects and/or manages telemetry data for a UAV 102. In this example, the RC management service 118 may determine an association between the associated UAV device $106_3$ and the UAV $102_2$ such that telemetry data generated and transmitted by the UAV $102_2$ is routed to the associated UAV device $106_3$ at operation 706.

In one embodiment, routing communications for the examples provided in FIG. 9A, FIG. 9B, and FIG. 9C may be performed by instantiating RC applications 803 with corresponding modules 807. For instance, routing communications for the examples provided in FIG. 9B and FIG. 9C at operation 706 may be performed by sub-operations 706A and 706B, respectively. In particular, at sub-operation 706A, the RC application 803B may be instantiated in a virtual machine for the associated UAV device $106_2$. The RC application 803B is configured to handle a first set of communications between the UAV $102_2$ and the associated UAV device $106_2$. For example, as shown in FIG. 9B, the associated UAV device $106_2$ may be a radio controller and the RC application 803B may be configured with a control proxy module 807B to route flight commands from the associated UAV device $106_2$ to the UAV $102_2$. At sub-operation 706B, the RC application 803C may be instantiated in a virtual machine for the associated UAV device $106_3$. The RC application 803C is configured to handle a second set of communications between the UAV $102_2$ and the associated UAV device $106_3$. For example, as shown in FIG. 9C, the associated UAV device $106_3$ may be a telemetry computer and the RC application 803B may be configured with a telemetry collector module 807A to route flight telemetry data from the UAV $102_2$ to the associated UAV device $106_3$.

As noted above, in one embodiment, routing of communications may be performed in response to determining an association between an associated UAV device 106 and a UAV 102. The RC management service 118 may determine an association between an associated UAV device 106 and a UAV 102 based on queries to the HSS 116 and/or the UTM system 100A. For example, the RC management service 118 may determine an identifier for an associated UAV device $106_1$, which was determined at operation 702 to be attached to the wireless network 108, and an identifier for the UAV $102_1$, which was determined at operation 704 to be connected to the wireless network 108. In one embodiment, the identifiers for the associated UAV device $106_1$ and/or the UAV $102_1$ may be based on a subscriber identification module (SIM) card installed in both devices, soft SIM cards, pre-installed public and private keys, etc. Based on the identifiers for the associated UAV device $106_1$ and the UAV $102_1$, the RC management service 118 may query the HSS 116 and/or the UTM system 100A to determine an association. In one embodiment, an association may be determined based on locating an entry in a data structure with both the identifier of the associated UAV device $106_1$ and the identifier of the UAV $102_1$.

In one embodiment, in response to determining an association between an associated UAV device 106 and a UAV 102, a first set of setup packets may be transmitted to the associated UAV device 106 and a second set of setup packets may be transmitted to the UAV 102. In this embodiment, the first set of setup packets may include bearer information of the UAV 102 and the second set of setup packets may include bearer information of the associated UAV device 106. In one embodiment, the RC management service 118 may transmit the first and second sets of setup packets to the respective associated UAV device 106 and UAV 102. In one embodiment, transmission of setup packets may be performed in lieu of using the RC management service 118 to route all communications between the corresponding associated UAV device 106 and UAV 102. For example, based on the setup packets, the associated UAV device 106 and UAV 102 may direct future communications directly to the UAV 102 and the associated UAV device 106, respectively.

At operation 708, the RC management service 118 may detect an event associated with a UAV 102 and/or an associated UAV device 106. For example, in the example of FIG. 9A, the event may be (1) the UAV $102_1$ entering an airspace without authorization or (2) the associated UAV device $106_1$ detaching from the wireless network 108. Either of these events may cause a situation where control of the UAV $102_1$ cannot remain with the UAV operator $104_1$ that is in control or is otherwise managing the associated UAV device $106_1$. Upon detecting an event at operation 708, the RC management service 118 may generate one or more commands for transmission to the UAV $102_1$ at operation 710 to control the UAV $102_1$ and in particular to control the flight of the UAV $102_1$ (e.g., flight commands that control one or more of motor(s) 502, motor controller(s) 504, actuator controller(s) 508, actuator(s) 510, and flight control system 514). The commands of operation 710 may be generated for transmission in place of the commands from the associated UAV device $106_1$. In particular, by entering an airspace without authorization (e.g., entering a restricted airspace over an airport or public event), a law enforcement official may need to take control of the UAV $102_1$. Accordingly, upon detecting at operation 708 the UAV $102_1$ entering an airspace without authorization (i.e., an event), the RC management service 118 may generate flight commands for the UAV $102_1$ at operation 710. In one example embodiment, the flight commands of operation 710 may direct the UAV $102_1$ away from the airspace that the UAV $102_1$ does not have authorization to enter and/or to a law enforcement landing site such that a law enforcement agent may take possession of the UAV $102_1$. In another example embodiment, the flight commands of operation 710 may direct the UAV $102_1$ to a safe landing site. In one embodiment, generation and or transmission of commands by a law enforcement official may be caused by the lawful intercept of control module 807C of an RC application 803.

Figure 10:
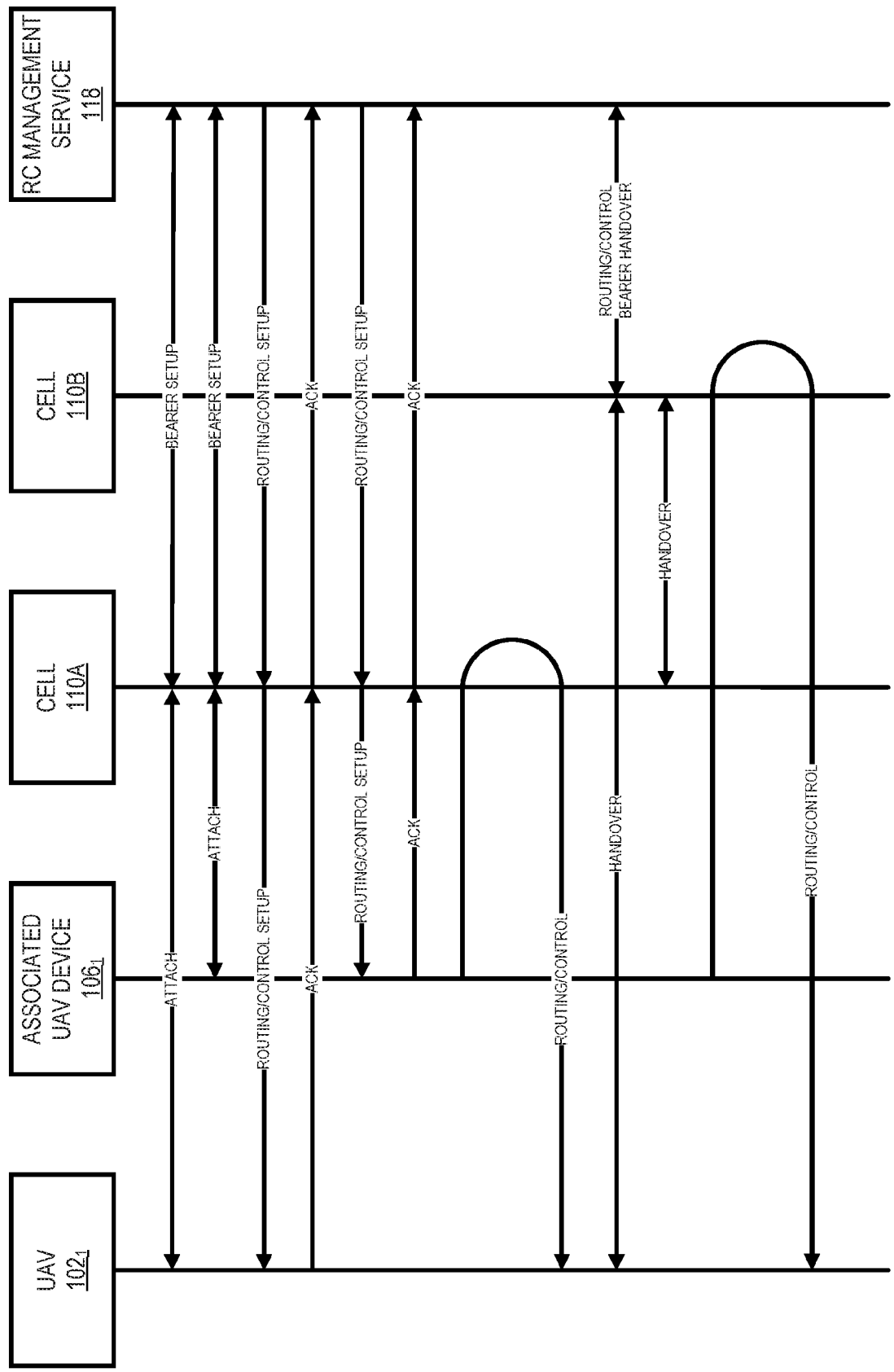
FIG. 10 shows a flow diagram for routing communications between a UAV and associated UAV device during a handover between cells according to one embodiment.

Although described as UAVs 102 and associated UAV devices 106 remaining connected to the same cells 110 in the wireless network 108 during the above communications, in some situations UAVs 102 and/or associated UAV devices 106 may disconnect from one cell 110 in the wireless network 108 and reconnect with a different cell 110 in the wireless network 108. This transition may require a handover procedure to be conducted. For example, as shown in FIG. 10, the UAV $102_1$ may attach to the cell 110A such that corresponding bearer setup information may be passed to the RC management service 118. Similarly, the associated UAV device $106_1$ may attach to the cell 110A such that corresponding bearer setup information may be passed to the RC management service 118. Following attachment, a routing/control setup procedure may be performed between (1) the UAV $102_1$ and the RC management service 118 via the cell 110A (with corresponding acknowledgement (ACK) of such setup from the UAV $102_1$) and (2) the associated UAV device $106_1$ and the RC management service 118 via the cell 110A (with corresponding acknowledgement (ACK) of such setup from the associated UAV device $106_1$). Based on the above described routing/control setup procedure, communications may be routed between the UAV $102_1$ and the associated UAV device $106_1$ via the cell 110A. However, as shown in FIG. 10, the UAV $102_1$ may disconnect from the cell 110A and reconnect with the wireless network 108 via the cell 110B. This action may result in a handover being triggered such that state, bearer, and/or other information may be transferred to the cell 110B. In this example embodiment, the handover may be triggered and/or controlled by the RC management service 118. In this fashion, the RC management service 118 may maintain the UAV $102_1$ continually connected with the associated UAV device $106_1$ such that routing of communications is not interrupted. Further, the RC management service 118 may facilitate handovers between cells 110 in other access networks 108 and between different radio technologies (e.g., between GERAN 108A, UTRAN 108B, and E-UTRAN 108C). After the handover has been completed, communications may be routed/tunneled between the cells 110A and 110B via an interface between the cells 110A and 110B (e.g., the X2 interface when the cells 110A and 110B are eNodeBs). Although described as the handover being managed by the RC management service 118, in other embodiments, handovers may be handled by the cells 110 themselves with reporting to the RC management service 118.

As described above, the method 700 and the RC management service 118 may facilitate the use of a wireless cellular network 108 (e.g., the GERAN 108A, the UTRAN 108B, and/or the E-UTRAN 108C) to connect UAVs 102 and associated UAV devices 106 (e.g., radio controllers and/or telemetry computers). In particular, to allow streamlined use of the wireless cellular network with UAVs 102 and associated UAV devices 106, the method 700 and the RC management service 118 may be employed to intelligently route communications between UAVs 102 and associated UAV devices 106 attached to the wireless cellular network 108. In comparison to traditional line-of-sight connections that are characterized by low bandwidth and inconsistent transmission quality and range, cellular networks provide high bandwidth for the transmission of large volumes of data (e.g., telemetry, video, and image data and/or complex flight commands) and consistent, long-range coverage.

Figure 11:
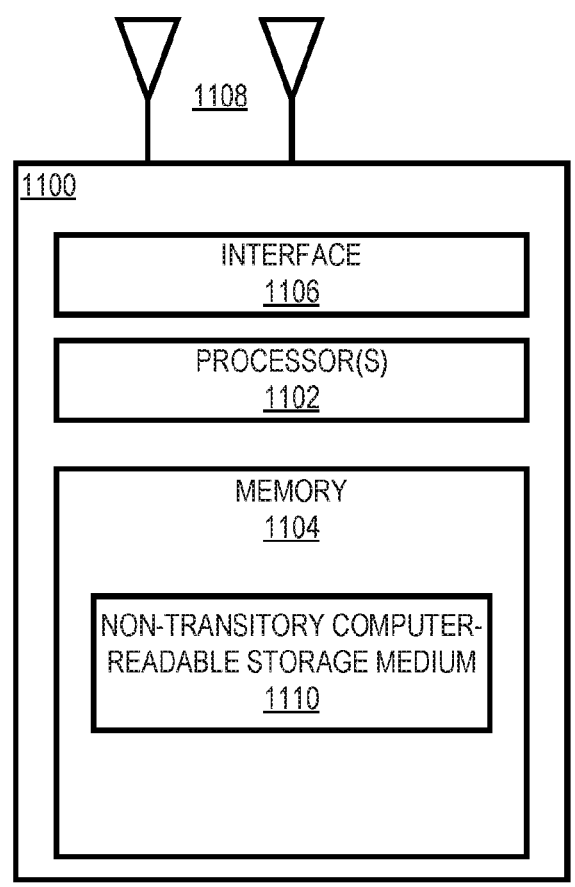
FIG. 11 illustrates a computing/networking device according to one embodiment.

Each element of the air traffic system 100 may be composed of or otherwise implemented by a set of computing/networking devices. For example, FIG. 11, illustrates a computing/networking device 1100 according to one embodiment. As shown the computing/networking device 1100 may include a processor 1102 communicatively coupled to a memory 1104 and an interface 1106. The processor 1102 may be a microprocessor, controller, microcontroller, central processing unit, digital signal processor, application specific integrated circuit, field programmable gate array, any other type of electronic circuitry, or any combination of one or more of the preceding. The processor 1102 may comprise one or more processor cores. In particular embodiments, some or all of the functionality described herein as being provided by a component of the air traffic system 100 may be implemented by one or more processors 1102 of one or more computing/networking devices 1100 executing software instructions, either alone or in conjunction with other computing/networking devices 1100 components, such as the memory 1104.

The memory 1104 may store code (which is composed of software instructions and which is sometimes referred to as computer program code or a computer program) and/or data using non-transitory machine-readable (e.g., computer-readable) media 1110, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1104 may comprise non-volatile memory containing code to be executed by the processor 1102. Where the memory 1104 is non-volatile, the code and/or data stored therein can persist even when the computing/networking device 1100 is turned off (when power is removed). In some instances, while the computing/networking device 1100 is turned on, that part of the code that is to be executed by the processor(s) 1102 may be copied from non-volatile memory into volatile memory (e.g., dynamic random-access memory (DRAM), static random-access memory (SRAM)) of the computing/networking device 1100.

The interface 1106 may be used in the wired and/or wireless communication of signaling and/or data to or from computing/networking device 1100. For example, interface 1106 may perform any formatting, coding, or translating to allow computing/networking device 1100 to send and receive data whether over a wired and/or a wireless connection. In some embodiments, the interface 1106 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 1108 to the appropriate recipient(s). In some embodiments, interface 1106 may comprise network interface controller(s) (NICs), also known as a network interface card, network adapter, local area network (LAN) adapter or physical network interface. The NIC(s) may facilitate in connecting the computing/networking device 1100 to other devices allowing them to communicate via wire through plugging in a cable to a physical port connected to a NIC. In particular embodiments, the processor 1102 may represent part of the interface 1106, and some or all of the functionality described as being provided by the interface 1106 may be provided in part or in whole by the processor 1102.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing connections between an Unmanned Aerial Vehicle (UAV) and one or more associated UAV devices, the method comprising:
   determining, by a radio control management service, that one or more associated UAV devices are attached to a wireless network;
   determining, by the radio control management service, that one or more UAVs are attached to the wireless network;
   determining, by the radio control management service, an association between a first associated UAV device of the or more associated UAV devices and a first UAV of the one or more UAVs; and
   routing communications, by the radio control management service in response to determining that the first associated UAV device and the first UAV are attached to the wireless network, by:
      transmitting a first set of setup packets to the first associated UAV device in response to determining the association between the first associated UAV device and the first UAV, wherein the first set of setup packets includes bearer information of the first UAV; and
      transmitting a second set of setup packets to the first UAV in response to determining the association between the first associated UAV device and the first UAV, wherein the second set of setup packets include bearer information of the first associated UAV device.

2. The method of claim 1, wherein the first associated UAV device is a radio controller that generates flight commands for the first UAV and wherein the radio control management service routes the flight commands to an interface of the first UAV, and the flight commands are to cause the first UAV to adjust one or more flight parameters to adjust movement of the first UAV.

3. The method of claim 1, wherein the first associated UAV device is a telemetry device that consumes telemetry data produced by the first UAV and wherein the radio control management service routes the telemetry data from an interface of the first UAV to the telemetry device.

4. The method of claim 1, further comprising:
   determining, by the radio control management service, an association between a second associated UAV device of the one or more associated UAV devices and a second UAV of the one or more UAVs,
   wherein the radio control management service routes communications between the second associated UAV device and the second UAV in response to determining the association between the second associated UAV device and the second UAV.

5. The method of claim 1, further comprising:
   determining, by the radio control management service, an association between a second associated UAV device of the one or more associated UAV devices and the first UAV of the one or more UAVs,
   wherein the radio control management service routes communications between the second associated UAV device and the first UAV in response to determining the association between the second associated UAV device and the first UAV.

6. The method of claim 1, wherein radio control management service queries one of a Home Subscriber Server (HSS) of the wireless network and a UAV Traffic Management (UTM) system that manages flight plans for UAVs and is external to the wireless network to determine the association between the first associated UAV device and the first UAV.

7. The method of claim 1, wherein determining the association between the first associated UAV device and the first UAV comprises:
   determining, by the radio control management service, an identifier of the first associated UAV device;
   determining, by the radio control management service, an identifier of the first UAV; and
   locating an entry in a data structure that includes the identifier of the first associated UAV device and the identifier of the first UAV.

8. The method of claim 1, wherein routing communications further comprises:
   instantiating, by the radio control management service, a first application in a virtual machine, for the first associated UAV device, wherein the first application is configured to handle a first set of communications between the first UAV and the first associated UAV device.

9. The method of claim 8, wherein routing communications further comprises:
   instantiating, by the radio control management service, a second application in the virtual machine, for a second associated UAV device in the one or more associated UAV devices, wherein the second application is configured to handle a second set of communications between the first UAV and the second associated UAV device.

10. The method of claim 1, further comprising:
    detecting, by the radio control management service, an event associated with the first UAV or the first associated UAV device; and generating, by the radio control management service, commands to control the first UAV in place of commands from the first associated UAV device.

11. The method of claim 10, wherein the event is one of (1) the first UAV entering an airspace without authorization and (2) the first associated UAV device detaching from the wireless network.

12. A non-transitory computer-readable storage medium storing instructions that when executed by a set of one or more processors of a computing device for managing connections between an Unmanned Aerial Vehicle (UAV) and one or more associated UAV devices, cause the computing device to perform operations comprising:
 determining, by a radio control management service, that one or more associated UAV devices are attached to a wireless network;
 determining, by the radio control management service, that one or more UAVs are attached to the wireless network;
 determining, by the radio control management service, an association between a first associated UAV device of the or more associated UAV devices and a first UAV of the one or more UAVs; and
 routing communications, by the radio control management service in response to determining that the first associated UAV device and first UAV are attached to the wireless network, by:
  transmitting a first set of setup packets to the first associated UAV device in response to determining the association between the first associated UAV device and the first UAV, wherein the first set of setup packets includes bearer information of the first UAV; and
  transmitting a second set of setup packets to the first UAV in response to determining the association between the first associated UAV device and the first UAV, wherein the second set of setup packets include bearer information of the first associated UAV device.

13. The non-transitory computer-readable storage medium of claim 12, wherein the first associated UAV device is a radio controller that generates flight commands for the first UAV and wherein the radio control management service routes the flight commands to an interface of the UAVs first UAV, and the flight commands are to cause the first UAV to adjust one or more flight parameters to adjust movement of the first UAV.

14. The non-transitory computer-readable storage medium of claim 12, wherein the first associated UAV devices is a telemetry device that consumes telemetry data produced by first UAV and wherein the radio control management service routes the telemetry data from an interface of the first UAV to the telemetry device.

15. A network device to manage connections between an Unmanned Aerial Vehicle (UAV) and one or more associated UAV devices, comprising:
 a processor; and
 a memory coupled to the processor, wherein the memory includes instructions that, when executed by the processor cause the network device to:
  determine, by a radio control management service, that one or more associated UAV devices are attached to a wireless network;
  determine, by the radio control management service, that one or more UAVs are attached to the wireless network;
  determine, by the radio control management service, an association between a first associated UAV device of the or more associated UAV devices and a first UAV of the one or more UAVs; and
  route communications, by the radio control management service in response to determining that the first associated UAV device and the first UAV are attached to the wireless network, by operations to:
   transmit a first set of setup packets to the first associated UAV device in response to determining the association between the first associated UAV device and the first UAV, wherein the first set of setup packets includes bearer information of the first UAV; and
   transmit a second set of setup packets to the first UAV in response to determining the association between the first associated UAV device and the first UAV, wherein the second set of setup packets include bearer information of the first associated UAV device.

16. The network device of claim 15, wherein the first associated UAV device is a radio controller that generates flight commands for the first UAV and wherein the radio control management service routes the flight commands to an interface of the first UAV, and the flight commands are to cause the first UAV to adjust one or more flight parameters to adjust movement of the first UAV.

17. The network device of claim 15, wherein the first associated UAV device is a telemetry device that consumes telemetry data produced by the first UAV and wherein the radio control management service routes the telemetry data from an interface of the first UAV to the telemetry device.

* * * * *